US006857494B2

(12) United States Patent
Kobayashi et al.

(10) Patent No.: US 6,857,494 B2
(45) Date of Patent: Feb. 22, 2005

(54) STEERING-WHEEL REVOLUTION NUMBER CORRECTION SYSTEM OF ALL-WHEEL-DRIVE VEHICLE

(75) Inventors: Tetsuo Kobayashi, Oyama (JP); Kazuhito Nishimaki, Oyama (JP)

(73) Assignee: Komatsu Ltd., Tokyo (JP)

( * ) Notice: Subject to any disclaimer, the term of this patent is extended or adjusted under 35 U.S.C. 154(b) by 66 days.

(21) Appl. No.: 09/945,610

(22) Filed: Sep. 5, 2001

(65) Prior Publication Data

US 2002/0027025 A1 Mar. 7, 2002

(30) Foreign Application Priority Data

Sep. 6, 2000 (JP) ........................................ 2000-270167
Sep. 6, 2000 (JP) ........................................ 2000-270168

(51) Int. Cl.[7] .............................................. B60K 25/04
(52) U.S. Cl. ........................ 180/243; 180/235; 180/242; 180/307
(58) Field of Search ................................ 180/243, 234, 180/235, 242, 305, 307, 308, 6.2, 6.3

(56) References Cited

U.S. PATENT DOCUMENTS

| 4,177,870 A | * 12/1979 | Henn ........................ 180/243 |
| 4,186,816 A | 2/1980 | Pfundstein |
| 4,402,181 A | * 9/1983 | Acker ....................... 180/308 |
| 4,635,743 A | * 1/1987 | Riehl ........................ 180/243 |
| 4,798,259 A | * 1/1989 | Azuma ...................... 180/233 |
| 4,886,142 A | * 12/1989 | Yamaoka .................... 180/242 |
| 5,147,010 A | 9/1992 | Olson et al. |
| 5,553,517 A | * 9/1996 | Yesel ........................ 180/243 |
| 5,564,519 A | * 10/1996 | Katoh ....................... 180/243 |
| 6,508,328 B1 | * 1/2003 | Kenyon ...................... 180/308 |

FOREIGN PATENT DOCUMENTS

| JP | 54-157931 | 12/1979 | |
| JP | 57-201724 | * 12/1982 | .................. 180/243 |
| JP | 58-142062 | 8/1983 | |
| JP | 59-14774 | 1/1984 | |
| JP | 61-150839 | 7/1986 | |
| JP | 6-156101 | 6/1994 | |
| JP | 7-77870 | 8/1995 | |

* cited by examiner

Primary Examiner—Daniel G. DePumpo
(74) Attorney, Agent, or Firm—Armstrong, Kratz, Quintos, Hanson & Brooks, LLP

(57) ABSTRACT

Turning radius is calculated from steering angles of steering-wheels and articulation angles of respective frames, and the steering-wheels are automatically rotated faster than rear-wheels based on the turning radius, the revolution number of the rear-wheels, engine speed of an engine and a speed range of hydraulic motors, so that conventional trouble for manipulating operation lever etc. while turning a motor grader and skill-requiring work for adjusting the revolution number of the steering-wheels in accordance with the revolution number of the rear-wheels can be eliminated, thereby easily and accurately controlling the revolution number of the steering-wheels and securely preventing tight-corner braking phenomenon.

5 Claims, 12 Drawing Sheets

AVERAGE STEERING ANGLE ($\alpha_L \cdot \alpha_R/2$) $\alpha_{AV}$

ARTICULATION ANGLE $\beta$

STEERING-WHEEL REVOLUTION NUMBER CORRECTION SYSTEM OF ALL-WHEEL-DRIVE VEHICLE

BACKGROUND OF THE INVENTION

1. Field of the Invention

The present invention relates to a steering-wheel revolution number correction system of all-wheel-drive vehicle. More specifically, it relates to a steering-wheel revolution number correction system of a construction equipment provided with an all-wheel-drive, such as a motor grader and a wheel loader.

2. Description of Related Art

Recently, all-wheel-drive for driving all of front and rear wheels is often provided to a motor grader, etc.

The all-wheel drive drives the rear-wheel by an output of an engine transmitted through a transmission and the output of the engine is transmitted to a hydraulic pump, where right and left front-wheels are driven by a pair of hydraulic motors rotated by delivery oil from the hydraulic pump.

Incidentally, when the vehicle turns, because the turning radius of the front-wheel becomes greater than the turning radius of the rear-wheel on account of inner race difference, the front-wheel has to be rotated faster than the rear-wheel. In a rear-wheel-drive vehicle solely driving the rear wheel thereof, the front-wheel freely rotates in accordance with turning radius. However, in a vehicle having an all-wheel-drive where the front-wheel rotates in synchronization with the rotation of the rear-wheel, the rotation difference of the front and rear wheels caused by the inner race difference during turning movement cannot be completely absorbed, so that the vehicle turns with the front-wheel being braked. Accordingly, unless the front-wheel is rotated faster than the rear-wheel, a so-called "tight-corner" braking phenomenon occurs during turning movement and the vehicle does not turn smoothly.

In order to rotate the hydraulic-motor-driven front-wheel faster than the engine-driven rear-wheel, U.S. Pat. No. 4,186,816 discloses switching a control mode of a hydraulic pump to rotate the front-wheel faster than the rear-wheel by a predetermined ratio (several percent).

Further, U.S. Pat. No. 5,147,010 discloses monitoring and controlling the hydraulic pressure applied to the hydraulic motor to change the revolution number of the hydraulic motor in accordance with slippage of the rear-wheel, thereby rotating the front-wheel faster than the rear-wheel.

However, according to the disclosure of the U.S. Pat. No. 4,186,816, because the front-wheel always rotates faster than the rear-wheel by a predetermined ratio, a problem occurs when the vehicle turns at the same speed (the same revolution number of the rear-wheel) and with different turning radius. Specifically, though the front-wheel has to be rotated faster as the turning radius becomes smaller, since the revolution number of the front-wheel is determined irrespective of the turning radius, the front-wheel does not rotate at a revolution number corresponding to the turning radius, so that the tight-corner braking phenomenon cannot be securely prevented.

Further, the rotation of the front-wheel faster than the rear-wheel by the several percent cannot rotate the front-wheel sufficiently fast when the vehicle turns with a small turning radius.

Because the slippage of the rear-wheel is required in the technique shown in U.S. Pat. No. 5,147,010, the front-wheel does not rotate fast when the vehicle is turned and the rear-wheel does not always slip, so that the tight-corner braking phenomenon cannot be securely prevented.

Further, because only the hydraulic pressure to the hydraulic motor is monitored in this technique, when the ground pressure of the front-wheel is decreased and is likely to be slipped when, for instance, the work is conducted while keeping the blade in contact with the ground, the hydraulic motor may be rotated at a high speed without sufficient hydraulic pressure and the front-wheel may keep on slipping. The energy is wasted in the above condition.

On the other hand, an auxiliary lever for manually controlling the rotation of the hydraulic motor may be provided and operated while turning the vehicle for rotating the front-wheel faster than the rear-wheel. In this arrangement, the front-wheel can be rotated faster than the rear-wheel by a desired ratio during turning movement, so that the vehicle can be rotated smoothly.

However, it is so troublesome to operate the auxiliary lever throughout turning the vehicle in addition to steering operation. Further, it takes considerable skill and is not easy to properly adjust the revolution number of the front-wheel in accordance with the speed of the vehicle and the turning radius.

On the other hand, it is possible to calculate the turning radius by detecting the steering angle of the front-wheel and to rotate the front-wheel faster than the rear-wheel based on the turning radius.

However, in an articulating motor grader having the front-wheel and the rear-wheel attached to independent frames, the respective frames being angle-adjustably connected, because the turning radius on the front-wheel side greatly changes relative to the rear-wheel side not only by the steering operation but by articulating the front frame on the front-wheel side relative to the rear frame on the rear-wheel side, accurate turning radius cannot be obtained only by detecting the steering angle.

SUMMARY OF THE INVENTION

In the present invention, following arrangement is used for a steering-wheel revolution number correction system of an all-wheel-drive vehicle for easily and accurately controlling the revolution number of the front-wheel while turning the vehicle and securely preventing the tight-corner braking phenomenon even when the vehicle has an articulating type frame.

In the present invention, the following arrangement is used for an all-wheel-drive vehicle having an articulating frame.

A steering-wheel revolution number correction system of all-wheel-drive vehicle according to an aspect of the present invention is used for an all-wheel-drive vehicle having an all-wheel-drive for driving a rear-wheel by an output transmitted through a transmission, for transmitting the output of the engine to a hydraulic motor and for driving a front-wheel by a hydraulic motor rotated by a delivery oil from the hydraulic pump, a front frame provided with the front-wheel and a rear frame provided with the rear-wheel, the front frame and the rear frame being angle-adjustably connected, the system including: a front-wheel steering angle sensor for detecting a steering angle of the front-wheel; an articulation angle sensor for detecting a connection angle of the front frame and the rear frame; a turning radius operation for calculating a turning radius of the vehicle based on the steering angle of the front-wheel and the connection angle of the frames; a rear-wheel revolution number sensor for detecting a revolution number of the rear-wheel; an engine speed sensor for detecting engine speed of the engine; and a steering-wheel revolution number controller for rotating the front-wheel faster than the rear-wheel based on the turning radius and the revolution number of the rear-wheel.

According to the above aspect of the present invention, after detecting the steering angle of the front-wheel by the front-wheel steering angle sensor and detecting the connection angle of the respective frames by the articulation angle sensor, the turning radius on the front-wheel side is calculated by the turning radius operation based on the steering angle and the connection angle. Then, the steering-wheel revolution number controller determines how many times faster the front-wheel has to be rotated than the rear-wheel based on the turning radius, and calculates the necessary revolution number of the front-wheel, i.e., the required revolution number of the hydraulic motor, from the ratio and the rear-wheel revolution number detected by the rear-wheel revolution number sensor. Further, the steering-wheel revolution number controller determines the optimum delivery oil flow rate from the hydraulic pump in accordance with the engine speed detected by the engine speed sensor and feeds the delivery oil to the hydraulic motor to rotate the hydraulic motor with the necessary revolution number, thereby automatically rotating the front-wheel faster than the rear-wheel. Accordingly, the trouble for manipulating the auxiliary lever during turning movement and uncertainty caused in adjusting the revolution number can be eliminated and accurate turning radius can be obtained by additionally considering the connection angle of the respective frames as well as the steering angle of the front-wheel.

On the other hand, according to another aspect of the present invention capable of being applied to an all-wheel-drive vehicle having no articulating frame, following arrangement is adopted.

A steering-wheel revolution number correction system of all-wheel-drive vehicle according to another aspect of the present invention is used for an all-wheel-drive vehicle having an all-wheel-drive for driving a rear-wheel by an output transmitted through a transmission, for transmitting the output of the engine to a hydraulic motor and for driving a front-wheel by a hydraulic motor rotated by a delivery oil from the hydraulic pump, the system including: a steering-wheel revolution number sensor for detecting respective revolution numbers of the right and left front-wheels; a turning radius operation for calculating a turning radius on the front-wheel side based on the revolution numbers of the right and the left front-wheels; a rear-wheel revolution number sensor for detecting a revolution number of the rear-wheel; an engine speed sensor for detecting engine speed of the engine; and a steering-wheel revolution number controller for rotating the front-wheel faster than the rear-wheel based on the turning radius and the revolution number of the rear-wheel.

According to the above aspect of the present invention, after the revolution numbers of the right and left front-wheels are detected by the steering-wheel revolution number sensor, the turning number on the front-wheel side is calculated based on the revolution numbers. Then, the steering-wheel revolution number controller initially determines how many times faster the front-wheel has to be rotated than the rear-wheel based on the turning radius and, subsequently, the necessary revolution number, i.e. required revolution number of the hydraulic motor is calculated by the ratio and the rear-wheel revolution number detected by the rear-wheel revolution number sensor. Further, the optimum delivery oil flow rate from the hydraulic pump in accordance with the engine speed detected by the engine speed sensor is determined by the steering-wheel revolution number controller and feeds the delivery oil to the hydraulic motor to rotate the hydraulic motor with the necessary revolution number, thereby automatically rotating the front-wheel faster than the rear-wheel. Accordingly, the trouble for manipulating the auxiliary lever during turning movement and uncertainty caused in adjusting the revolution number can be eliminated to achieve the above object.

In the above, the system may further include: a front frame provided with the front-wheel; a rear frame provided with the rear-wheel, the front frame and the rear frame being angle-adjustably connected; and an articulation angle sensor for detecting a connection angle of the front frame and the rear frame, where the turning radius operation determines the turning radius based on the revolution number of the right and left front-wheels and the connection angle of the respective frames.

Such an arrangement is suitably used for an articulating type motor grader including a front frame and a rear frame, so that the turning radius can be more accurately obtained.

In the above, a torque converter may preferably be provided between the engine and the transmission, and the rear-wheel revolution number sensor may preferably include a torque converter output side revolution number sensor for detecting a revolution number on an output side of the torque converter and a speed range sensor for detecting a speed range of the transmission connected to the output side of the torque converter.

Some of the all-wheel-drive vehicles transmit the engine output to the transmission via a torque converter. In an such arrangement, the engine speed does not directly become the transmission input side revolution number on account of torque transfer loss in the torque converter.

Accordingly, in the present invention, the revolution number of the output side of the torque converter, i.e., the revolution number inputted to the transmission is detected by the torque converter output side revolution number sensor. Accordingly, the revolution number of the rear-wheel of the all-wheel-drive vehicle provided with the torque converter can be accurately detected by detecting the revolution number inputted to the transmission and the speed range of the transmission.

In the above, the steering-wheel revolution number controller may preferably control the flow rate of the delivery oil from the hydraulic pump to be supplied to the hydraulic motor based on the turning radius and the revolution number of the rear-wheel.

According to the above arrangement, the flow rate of the delivery oil is controlled by arranging the hydraulic pump as variable capacity type, the structure of the hydraulic motor side can be simplified and size thereof can be reduced, so that the hydraulic motor can be suitably accommodated in a narrow disposition space on the front-wheel side.

In the above arrangement, a plurality of speed ranges may preferably be set in the hydraulic motor, and the steering-wheel revolution number controller may preferably control the flow rate of the delivery oil from the hydraulic pump based on the speed range of the hydraulic motor as well as the turning radius and the revolution number of the rear-wheel.

According to the above arrangement, the respective motors are arranged as variable capacity type, the revolution number of the right and left front-wheels can be varied by providing the hydraulic motors, respectively, on the right and left front-wheels. In other words, it is advantageous to rotate the outer wheel side of the right and left front-wheels faster than the inner wheel side, so that the turning movement can be conducted further smoothly by controlling the respective front-wheels in such a manner.

Further, when the engine output is transmitted to the transmission through the torque converter, if the engine speed is rapidly dropped from the high-speed side, though only for a short time, the rear-speed continues to rotate at a high-speed on account of the characteristics of the torque converter. At this time, the rotation difference between the engine speed (hydraulic pump) and the rear-wheel is increased and, even when the flow rate of the delivery oil from the hydraulic pump is set at a maximum, the front-wheel cannot be rotated faster than the rear-wheel, thereby causing tight-corner braking phenomenon during the time period.

However, according to the present invention, because the revolution number of the hydraulic motor for driving the front-wheel is directly controlled, low-torque and high-speed drive can be achieved with small flow rate of delivery oil even when the flow rate of the delivery oil of the hydraulic pump is small, so that the revolution number of the hydraulic motor can be maintained at a high-speed rotation and the tight-corner braking phenomenon can be restrained.

DETAILED DESCRIPTION OF PREFERRED EMBODIMENT(S)

[First Embodiment]

FIGS. 1 to 5 show a motor grader 1 as an all-wheel-drive vehicle according to first embodiment of the present invention applied with the steering-wheel revolution number correction system of the present invention.

Figure 1:
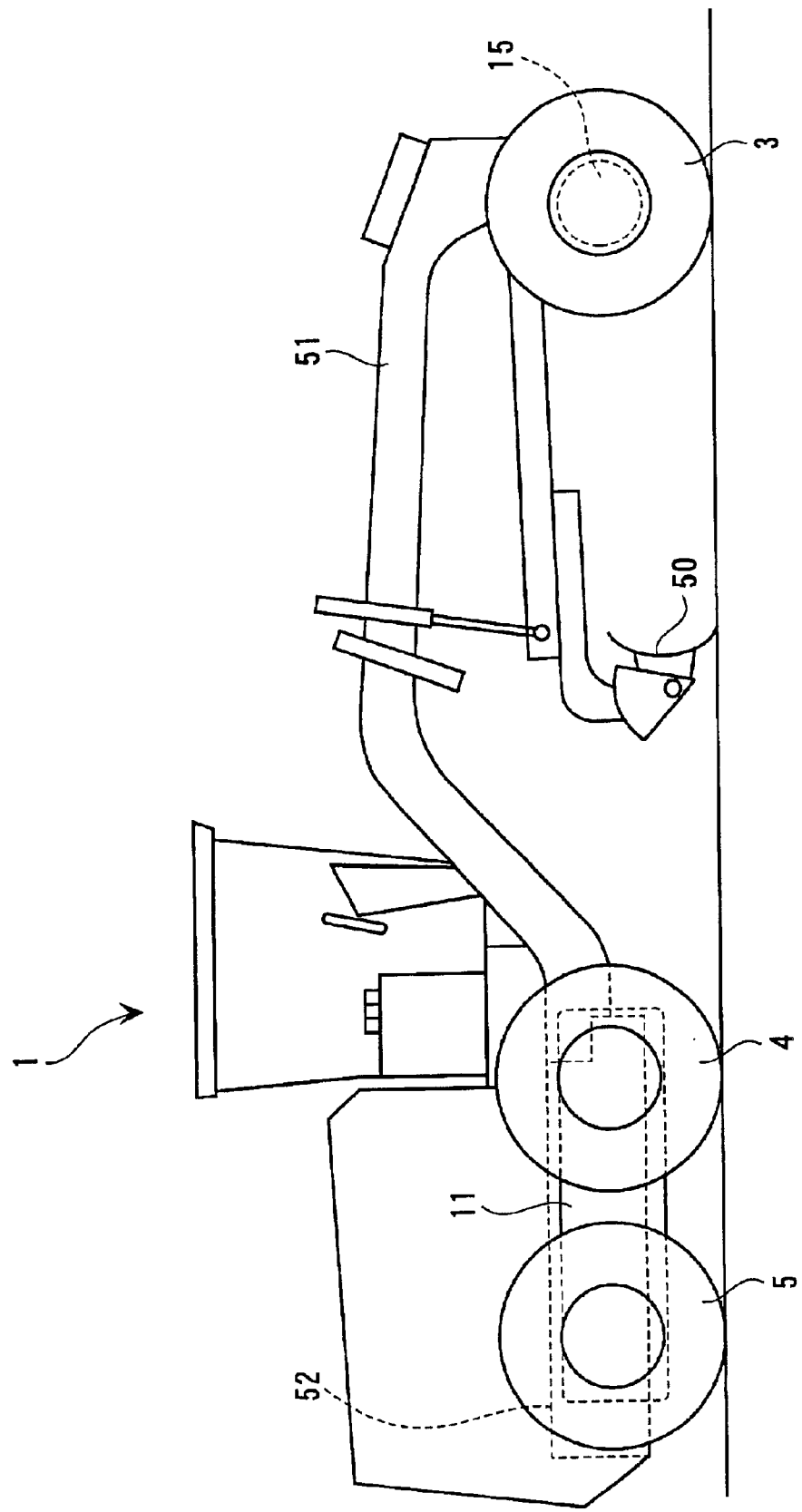
FIG. 1 is a schematic illustration showing entire motor grader applied with a steering-wheel revolution number correction system according to first embodiment of the present invention.
Figure 2:
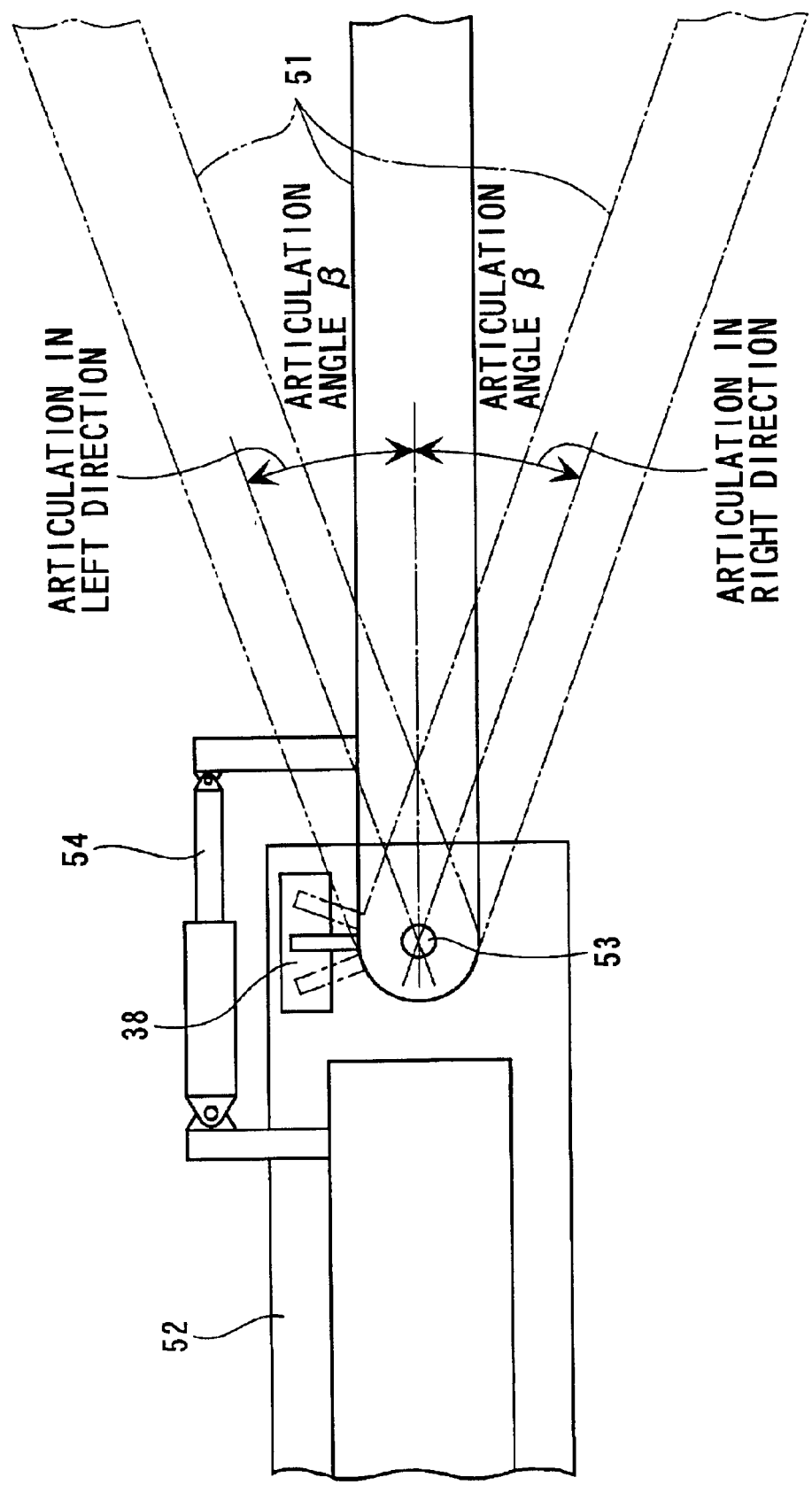
FIG. 2 is a plan view showing a primary portion of the motor grader according to the first embodiment.

In FIGS. 1 and 2, the motor grader 1 is a vehicle having total six wheels, i.e., a pair of front wheels of a left front-wheel 2 and right front-wheel 3, and rear-wheels which are provided in pairs on both sides, the rear-wheels including left rear-front wheel and left rear-rear wheel (not shown) and a right rear-front wheel 4 and a right rear-rear wheel 5, where a blade 50 provided between the front-wheels 2 and 3 and the rear-wheels 4 and 5 levels the ground, removes snow, cuts with low load and mixes material, etc.

The front-wheels 2 and 3 as well as the blade 50 are mounted on a front frame 51 and the rear-wheels 4 and 5 are mounted on the rear frame 52. As shown in FIG. 2, the front frame 51 is rotatably connected to the rear frame 52 by a vertical center pin 53 at approximately beneath a cockpit. The front frame 51 is turned by stretching and contracting an articulate cylinder 54 connected between the frames 51 and 52 by operating a lever from the cockpit. The turning radius while turning the motor grader 1 can be made smaller by turning (articulating) the front frame 51 relative to the rear frame 52.

Figure 3:
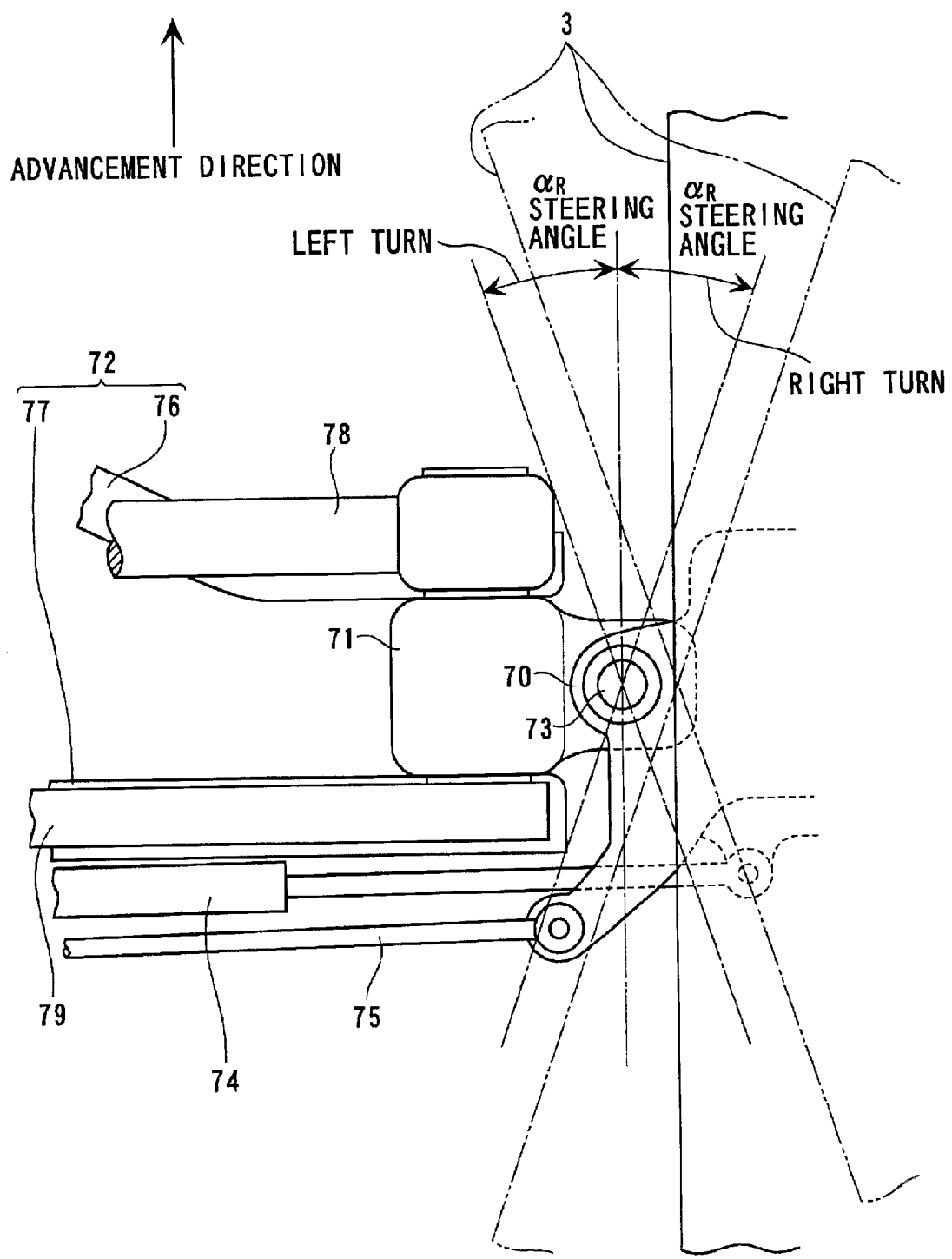
FIG. 3 is a plan view showing another primary portion of the motor grader according to the first embodiment.

As represented by the right front-wheel 3 shown in FIG. 3, the front-wheels 2 and 3 are connected to the front frame 51 (FIG. 1) through a knuckle 70, a knuckle support 71 and a front axle 72.

The knuckle 70 is connected to a knuckle support 71 through a king pin 73 and is turned around the king pin 73. The turning movement is conducted with a steering cylinder 74 having both ends connected between the knuckle 70 and the front axle 72 by steering operation in the cockpit. The knuckle arms 70 of the front-wheels 2 and 3 are connected by a tie rod 75.

The front axle 72 is composed of a first cross member 76 supporting lower front portion of the knuckle support 71 and a second cross member 77 supporting lower rear portion of the knuckle support 71.

A (rod of) leaning cylinder 78 for slanting (leaning) the right front-wheel 3 in right and left direction is connected to the upper front of the knuckle support 71 and a leaning rod 79 for transmitting the leaning movement to simultaneously lean the left front-wheel 2 (FIG. 1) is connected to the upper rear of the knuckle support. The leaning movement is effective for further lessening the turning radius in turning the motor grader 1.

Since the knuckles 70 on both right and left sides are connected by the tie rod 75 as described above, the knuckle on left side (not shown) can be turned by turning the right knuckle 70 by the single steering cylinder 74. However, the steering cylinder 74 may preferably be provided on the left side and the respective knuckles may be turned by respective steering cylinders 74. This is because, when the turning movement is conducted solely by the single steering cylinder 74 on the right front-wheel 3, steering operation can become different between left turn for advancing the rod and right turn for retracting the rod on account of speed difference between advancement and retraction of the rod.

Figure 4:
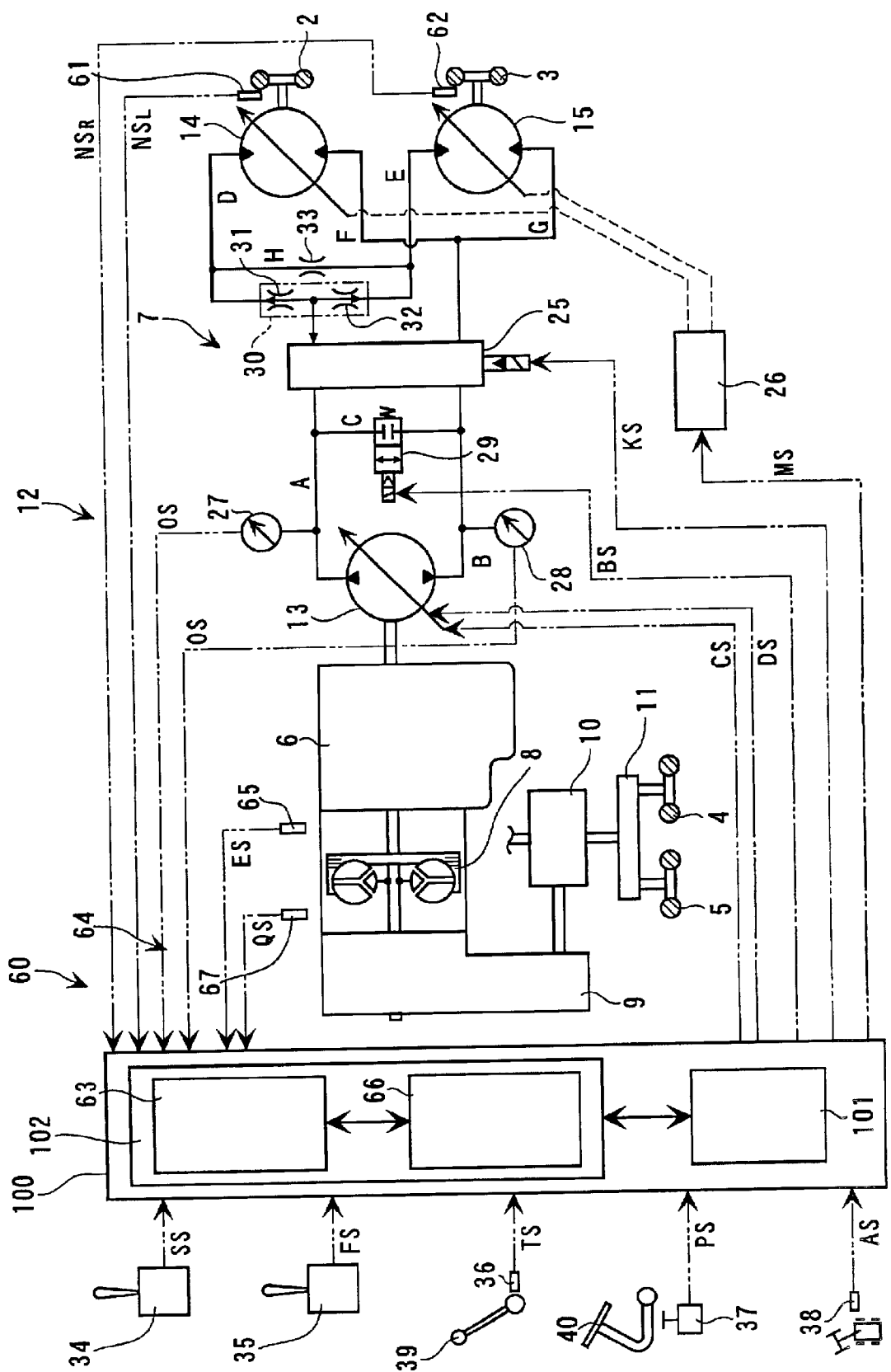
FIG. 4 is a block diagram showing an outline arrangement of the motor grader according to the first embodiment.

As shown in FIG. 4, the front-wheels 2 and 3 are driven by a hydraulic system 7 connected to an output of the engine 6. The rear-wheels 4 and 5 are driven through a torque converter 8, a transmission 9, a final drive 10 and a tandem device 11 connected to the other output of the engine 6. In other words, the motor grader 1 is an all-wheel-drive vehicle where the front and rear wheels 2 to 5 are driven by the power-generating and power-transmitting devices 6 to 11, the devices 6 to 11 constituting an all-wheel drive 12.

Almost all of the components of the all-wheel drive 12 (the engine 6, a part of the hydraulic system 7, the torque converter 8, the transmission 9, and the final drive 10) are supported by the rear frame 52.

The hydraulic system 7 of the all-wheel drive 12 includes a hydraulic pump 13 directly driven by the output of the engine 6, and a left hydraulic motor 14 and a right hydraulic motor 15 rotated by the hydraulic oil discharged from the hydraulic pump 13 to drive the front-wheels 2 and 3.

The hydraulic pump 13 of the present embodiment is a swash plate type axial plunger pump. In the hydraulic pump 13, the discharge amount of the hydraulic oil is controlled by changing the angle of the swash plate type (variable capacity type) by a control signal CS outputted from a controller 100 functioning as a computer. The discharge direction of the hydraulic oil of the hydraulic pump 13 is switchable between channels A and B by a direction switching signal DS outputted from the controller 100, so that the motor grader 1 is advanced and retracted by changing the discharge direction to change the rotary direction of the respective hydraulic motors 14 and 15.

However, the hydraulic pump to be used is not restricted to swash plate type but may be an angled axis type.

Figure 5A:
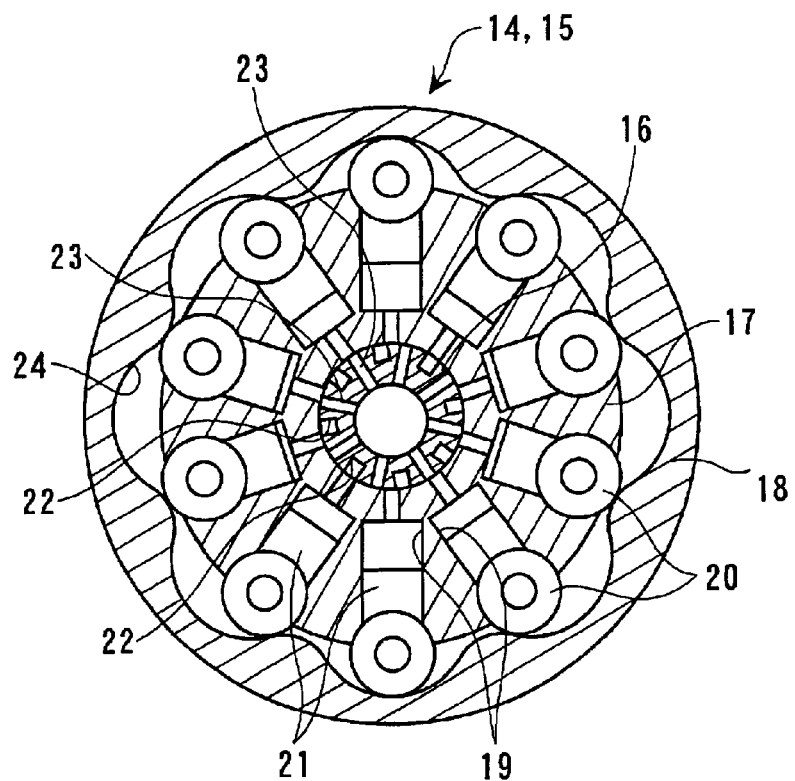
FIGS. 5(A) and 5(B) are cross sections showing a component of the motor grader according to the first embodiment.
Figure 5B:
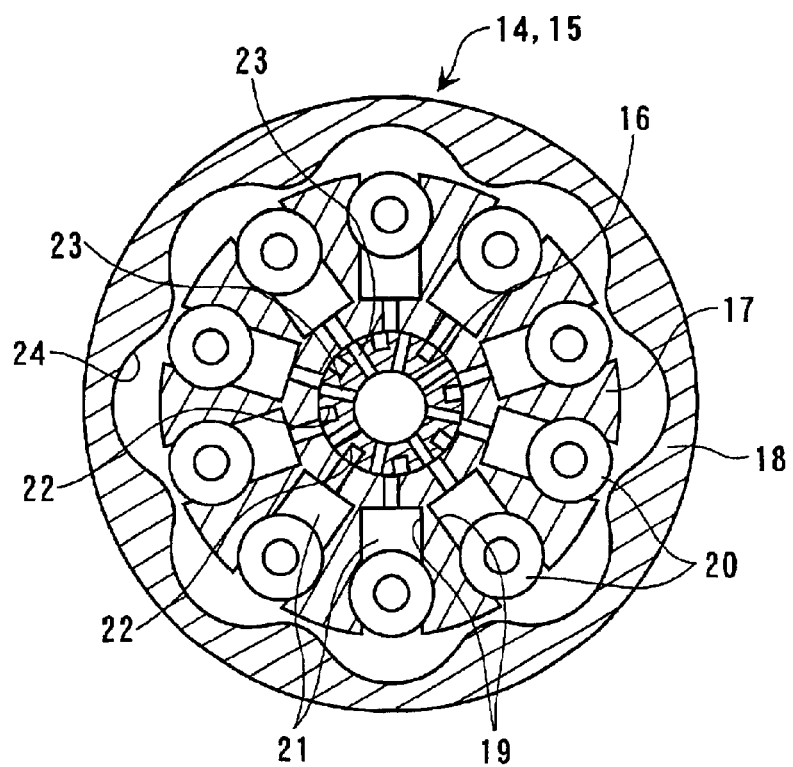

The hydraulic motors 14 and 15 are radial piston type in the present embodiment, which is integrated in the knuckle 60 shown in FIG. 3. As shown in FIGS. 5(A) and 5(B) enlarging cross section, the hydraulic motors 14 and 15 include a rotary valve 16 at the center thereof, a fixed core 17 with the rotary valve 16 being inserted, and a rotatable cam ring 18 disposed on the outer circumference of the fixed core 17, the cam ring 18 being connected to the front-wheels 2 and 3.

A plurality of cylinders 19 are radially formed on the fixed core 17, respective cylinders 19 advancebly and retractably accommodating a piston 21 having a roller 20 at a distal end thereof.

As shown in FIG. 5(A), the respective pistons 21 sequentially advance along circumferential direction by the hydraulic oil fed from a supply port 22 of the rotating rotary valve 16 into the cylinder 19 and retracts in sequence of advancement by the discharge of the hydraulic oil through a delivery port 23 and a biasing force of biasing member (not shown). During the time, the roller 20 of the advancing piston 21 contacts a cam surface 24 inside the cam ring 18 to rotate the cam ring 18.

On the other hand, FIG. 5(B) shows a condition in which all of the pistons 21 are restracted. Such a condition is achieved by shutting the supply of the hydraulic oil toward the hydraulic motors 14 and 15. The supply of the hydraulic oil is shut by actuating a free wheel valve 25 by a drive type switching signal KS from the controller 100. In this condition, the all-wheel driving of the motor grader 1 is released to be a rear-wheel driving.

Incidentally, for instance, two-stage speed ranges are set in the hydraulic motors 14 and 15 (stationary two stages, and not variable capacity type).

In the first stage, as shown in FIG. 5(A), the hydraulic oil is supplied from the supply port 22 of the rotary valve 16 to all of the pistons 21.

In the second stage, the hydraulic oil is supplied only to four pistons 21 among the ten pistons 21 disposed in X-shape (two pairs disposed on intersecting line) and not adjacent in circumferential direction, and the hydraulic oil is not supplied to the remaining six pistons 21. In this case, the other six pistons 21 are completely retracted and are not in contact with the cam ring 18 as shown in FIG. 5(B). In this speed range, supposing the delivery oil flow rate is the same as in the first stage, since the number of the piston 21 to which the hydraulic oil is supplied decreases to four, the applied hydraulic pressure becomes high and the four pistons 21 are advanced and retracted at a high speed and, consequently, rotate the cam ring 18 at a higher speed than in the first stage. On the other hand, if the delivery oil flow rate is less than the first stage, approximately the same revolution number as in the first stage can be obtained.

The first and the second speed ranges are automatically switched in accordance with speed ranges of the transmission 9 by a solenoid valve 26 actuated by a speed range switching signal MS from the controller 100.

Figure 7:
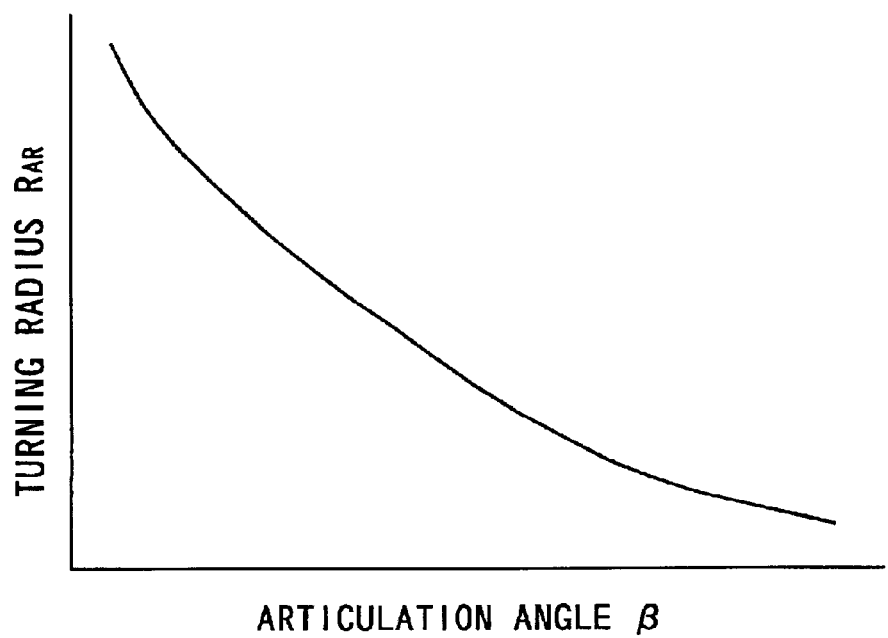
FIG. 7 is a graph showing contents of another lookup table used in the first embodiment.

Back to the hydraulic system 7 shown in FIG. 7, hydraulic sensors 27 and 28 are respectively provided on the channel A and B from the hydraulic pump 13 to judge whether the hydraulic pressure in the hydraulic circuit is proper or not based on a hydraulic pressure detecting signal OS outputted from the hydraulic sensors 27 and 28 to the controller 100.

An intercommunicating flow path C for intercommunicating the channels A and B is provided on the side of the hydraulic pump 13 relative to the free wheel valve 25, and an inching valve 29 is provided in the intercommunicating flow path C.

The inching valve 29 is actuated by a power transfer switching signal BS from the controller 100. When the intercommunicating flow path C is blocked by the inching valve 29 (condition shown in FIG. 4), the hydraulic oil discharged from the hydraulic pump 13 is supplied to the hydraulic motors 14 and 15. When the intercommunicating flow path C is in communication, the hydraulic oil circulates in the channels A to C and is not supplied to the hydraulic motors 14 and 15, thus not transmitting the power. Such inching valve 29 is used for suspending the drive of the front-wheels 2 and 3 by the hydraulic motors 14 and 15 for a temporary short time.

The hydraulic motors 14 and 15 are connected to the channels A and B in parallel. More specifically, a first left branched flow path D from one side of the left hydraulic motor 14 and a first right branched flow path E from one side of the right hydraulic motor 15 are connected to the channel A, and a second left branched flow path F from the other side of the left hydraulic motor 14 and a second right branched flow path G from the other side of the right hydraulic motor 15 are connected to the channel B.

The channel A, the first left branched flow path D and the first right branched flow path E are connected by a flow switching valve 30.

The flow switching valve 30 has throttles 31 and 32 on the side of the respective branched flow paths D and E. In the flow switching valve 30, the hydraulic oil is branched to the respective hydraulic motors 14 and 15 with the same flow rate when the hydraulic oil is discharged from the hydraulic pump 13 to the channel A, for instance, during advancement operation. On the contrary, when the hydraulic oil is discharged toward the channel B, for instance, during retraction movement, the hydraulic oil flowing through the respective branched flow paths D and E is combined at the same flow rate to, consequently, equalize the flow rate branched from the channel B to the second left branched flow path F and the second right branched flow path G.

The first left branched flow path D and the first right branched flow path E are intercommunicated by a bypass flow path H. A throttle 33 is provided to the bypass flow path H. On account of the bypass flow path H and the throttle 33, slightly more hydraulic oil is supplied to the hydraulic motor 14 (15) to be located outer side during turning movement than the other hydraulic motor 15 (14) located inner side. Accordingly, one of the front-wheel 2 (3) as an outer wheel is rotated slightly faster than the other front-wheel 3 (2) as an inner wheel, to conduct further smooth turning movement.

In FIG. 4, a drive type switching switch 34, a front-wheel rotation control lever 35, a speed range sensor 36 as a speed range detecting means, a limit switch 37 and an angle sensor 38 as an articulate angle detecting means are connected to the controller 100. The drive type switching switch 34, the front-wheel rotation control lever 35, the speed range sensor 36 and the limit switch 37 are respectively provided in the cockpit and the angle sensor 38 is situated outside the cockpit as shown in FIG. 2.

The drive type switching switch 34 switches the drive type of the motor grader 1 between all-wheel drive and the rear-wheel drive. When the switch is turned on and off, a switching signal SS is outputted to the controller 100 and the drive type switching signal KS is outputted to the above-described free wheel valve 25 by the controller 100 having received the signal SS to switch the drive type.

The front-wheel rotation control lever 35 is for manually adjusting a swash plate angle of the hydraulic pump 13, which outputs a swash plate angle adjusting signal FS each time the retractable control lever 35 is operated, and the controller having received the signal FS outputs a control signal CS to the hydraulic pump 13 to change the angle of the swash plate. Such a front-wheel rotation control lever 35 is used for reducing torque of the front-wheels 2 and 3 when the ground pressure of the front-wheels becomes low during the operation using the blade 50, which is effective for preventing slippage of the front-wheels 2 and 3.

The front-wheel rotation control lever 35 is also used for adjusting target revolution number of the front-wheels 2 and 3 in the steering-wheel revolution number correction system, which will be described later.

The speed range sensor 36 detects a speed range position of a transmission shift lever 39, i.e., advancement first to sixth, retraction first to sixth and neutral speed ranges of the lever 39, and outputs a speed range detecting signal TS to the controller 100. When the controller 100 judges that the front-wheels 2 and 3 has to be driven with low torque and high-speed, the controller 100 outputs a speed range switching signal MS to the solenoid valve 26 to switch the speed range of the hydraulic motors 14 and 15 to the second step on the higher speed side. When the speed range location is judged neutral by the speed range detecting signal TS, the controller 100 outputs a power transfer switching signal BS to the inching valve 29 to stop power transfer toward the hydraulic motors 14 and 15 to release drive of the front-wheels 2 and 3.

The speed range detecting signal TS from the speed range sensor 36 is also used in the steering-wheel revolution number correction system, which will be described later.

The limit switch 37 is turned on by stepping on the inching pedal 40 and, while the limit switch 37 is stepped on, outputs a control device step-on detecting signal PS to the controller 100. Because the power is not transmitted to the rear-wheels 4 and 5 by a speed switching clutch mechanism and a direction switching clutch mechanism for advancement and retraction (not shown) in the transmission 9 during the above condition, the controller 100 outputs the power transfer switching signal BS to the inching valve 29 to stop power transfer to the hydraulic motors 14 and 15 to release drive of the front-wheels 2 and 3.

As shown in FIG. 2, the angle sensor 38 detects an articulate angle (connection angle) β of the front frame 51 relative to the rear frame 52 and outputs an angle detection signal AS to the controller 100. The controller 100 having received the angle detection signal AS outputs a display signal to an indicator (not shown) in the cockpit to display turning condition of the front frame 5 on the indicator. The angle detection signal AS includes information on articulation direction such as leftward articulation and rightward articulation as well as the articulation angle β.

The angle detecting signal AS from the angle sensor 38 is also used in the steering-wheel revolution number correction system, which will be described below.

The steering-wheel revolution number correction system 60 according to the present embodiment will be described below.

In FIG. 4, the steering-wheel revolution number correction system 60 has a left steering angle sensor 61 as a front-wheel steering angle detecting means for detecting a steering angle (turning angle) of the left front-wheel 2, a right steering angle sensor 62 as another front-wheel steering angle detecting means for detecting a steering angle (turning angle) of the right front-wheel 3, the angle sensor 38 as an articulation angle detecting means, a turning radius operation 63 for determining turning radius of the front-wheels 2 and 3 based on the steering angle of the front-wheels 2 and 3 and the articulation angle β of the respective frames 51 and 52, a rear-wheel revolution number sensor 64 for detecting revolution number of the rear-wheels 4 and 5, an engine speed sensor 65 as an engine speed detecting means for detecting engine speed of the engine, and a steering-wheel revolution number controller 66 for controlling the revolution number of the front wheels 2 and 3 based on the turning radius, the revolution number of the rear-wheels 4 and 5 and the engine speed of the engine 6.

Figure 6:
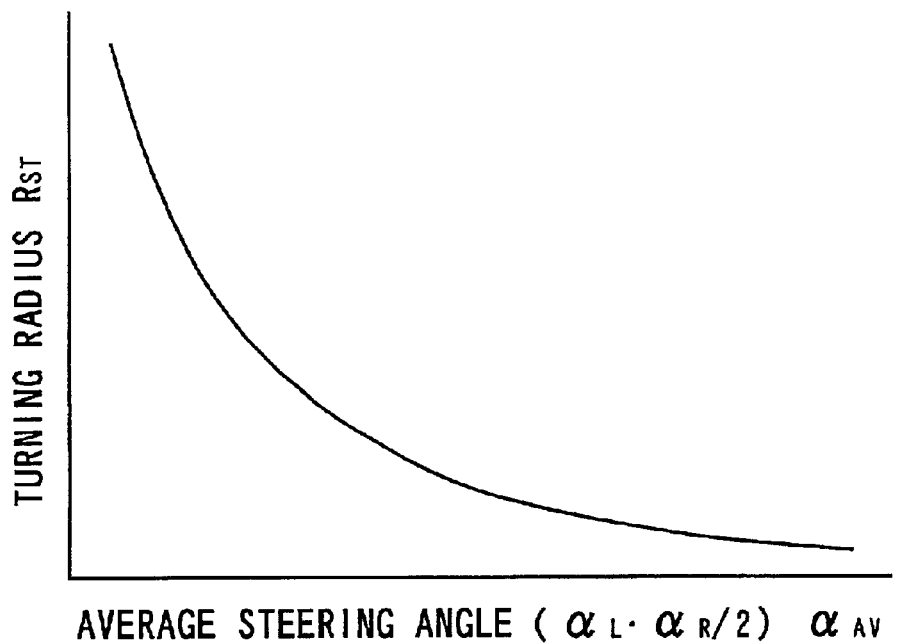
FIG. 6 is a graph showing contents of a lookup table used in the first embodiment.

The respective steering angle sensors 61 and 62 output a front-wheel steering angle detecting signal $VS_L$ and $VS_R$ corresponding to a steering angles $\alpha_L$ and $\alpha_R$ of the front-wheels 2 and 3 relative to the king pin 73 (FIG. 3) (see FIGS. 3 and 6: $\alpha_L$ shows the steering angle of the left front-wheel 2).

At this time, the steering angles $\alpha_L$ and $\alpha_R$ are detected for both of the front-wheels 2 and 3 because the steering angles $\alpha_L$ and $\alpha_R$ differ between the left front-wheel 2 and the right front-wheel 3 during turning movement. This is on account of the trapezoid link structure formed by the knuckle 70, the knuckle support 71, the front axle 72 and the tie rod 75.

The rear-wheel revolution number sensor 64 is composed of a converter output-side revolution sensor 67 as a converter output revolution number detecting means for detecting a revolution number of the output side of the torque converter 8 and the speed range detecting sensor 36 for detecting speed range position of the transmission shift lever 39.

The converter output-side revolution sensor 67 outputs a converter revolution number detecting signal QS to the controller 100.

The engine speed sensor 65 outputs an engine speed detecting signal ES to the controller 100.

The turning radius operation 63 and the steering-wheel revolution number controller 66 are software, which is stored in a memory 101 constituting the controller 100 such as ROM and RAM and is called from the memory 101 when the system 60 is actuated and is implemented by a CPU 102 as shown in FIG. 4.

The memory 101 of the controller 100 stores lookup table (not shown) tabling the graph shown in FIGS. 6 to 9 as well as the above software.

FIG. 6 is a graph showing a relationship between a means steering angle $\alpha_{AV}$ calculated by the respective steering angles $\alpha_L$ and $\alpha_R$ of the left front-wheel 2 and the right front wheel 3 and a turning radius $R_{ST}$ on the side of the front wheels 2 and 3.

FIG. 7 is a graph showing a relationship between the articulation angle β and the turning radius $R_{AR}$ on the side of the front-wheels 2 and 3.

Figure 8:
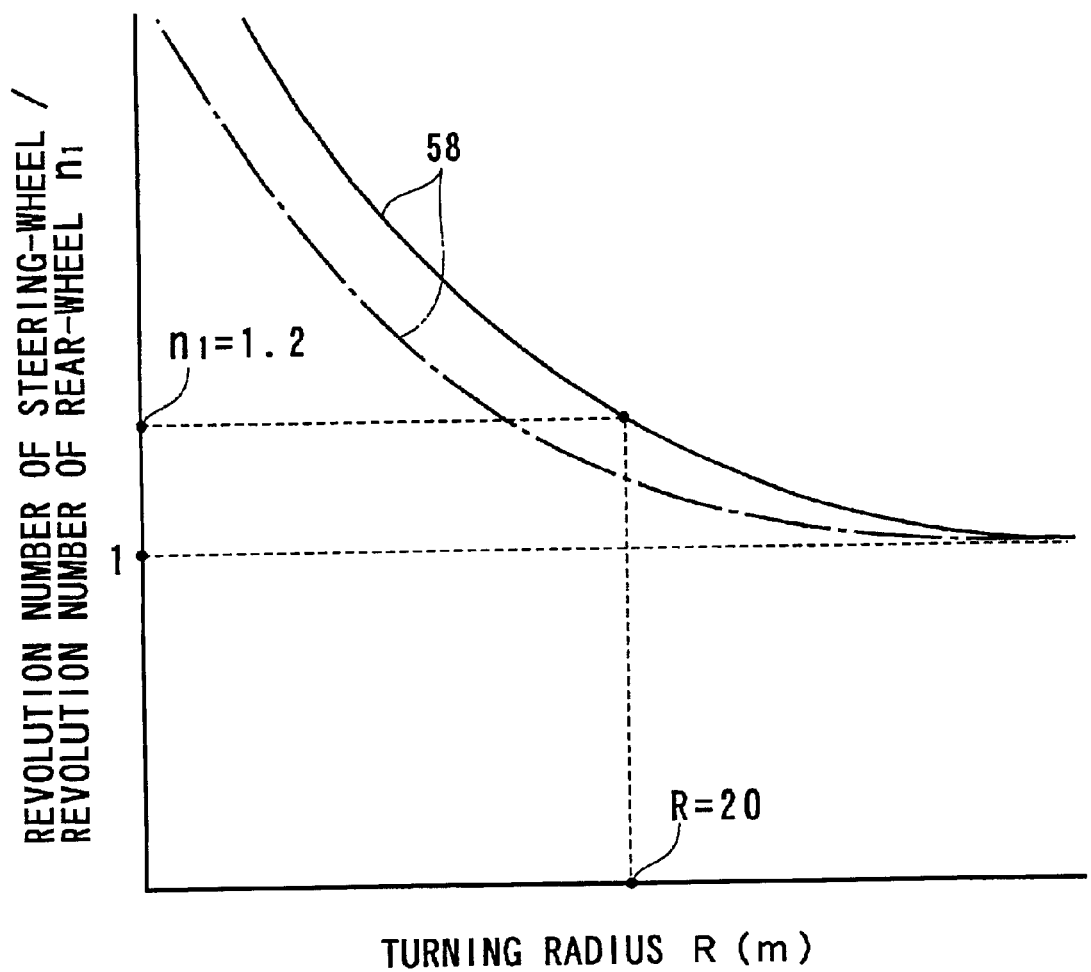
FIG. 8 is a graph showing contents of still another lookup table used in the first embodiment.

FIG. 8 is a graph showing a relationship between the turning radius R of the front-wheels 2 and 3 calculated based on the respective turning radiuses $R_{ST}$ and $R_{AR}$ and a ratio $n_1$ of the steering-wheel revolution number and a rear-wheel revolution number, from which how many times faster the front-wheels 2 and 3 have to be rotated relative to the rear-wheels 4 and 5 when turning at a predetermined turning radius R can be read.

Figure 9:
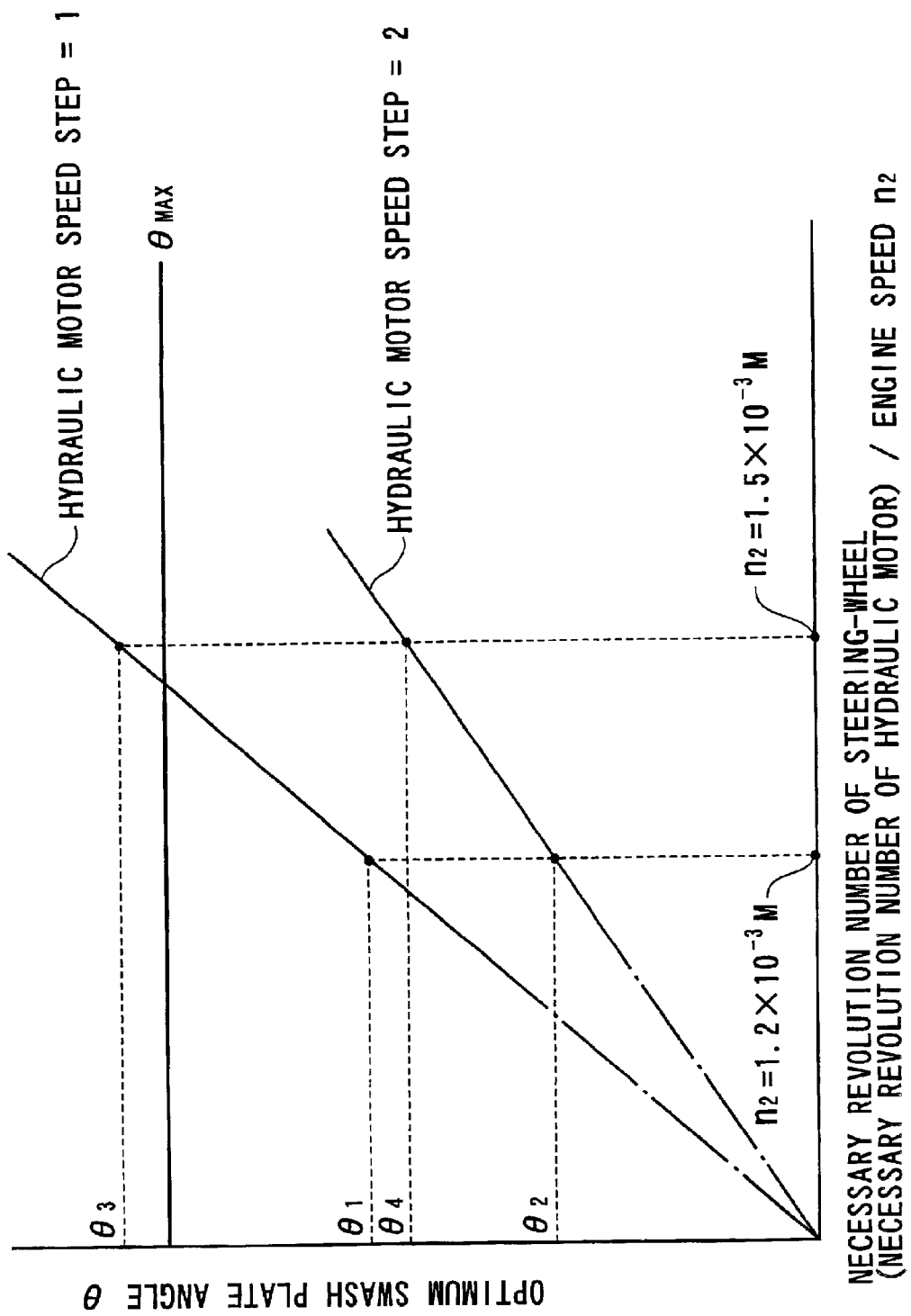
FIG. 9 is a graph showing contents of further lookup table used in the first embodiment.

FIG. 9 is a graph showing an optimum swash plate angle $\theta$ of the hydraulic pump 13 corresponding to a ratio $n_2$ of the necessary revolution number of the front wheel 2 and 3 (necessary revolution number of the hydraulic motors 14 and 15) and the engine speed of the engine 6, from which the optimum swash plate angle $\theta$ can be read for each speed range of the hydraulic motors 14 and 15.

Next, the revolution number control of the front wheels 2 and 3 by the steering-wheel revolution number correction system 60 will be specifically described below.

Initially, when the motor grader 1 is running, the turning radius operation 63 monitors the front-wheel steering angle detecting signal $VS_L$ and $VS_R$ outputted from the respective steering angle sensors 61 and 62 and the angle detecting signal AS outputted from the angle sensor 38.

When the motor grader 1 starts turning, the turning radius operation 63 calculates the mean value of the steering angles $\alpha_L$ and $\alpha_R$ to calculate the average turning angle $\alpha_{AV}$ based on the information of the steering angle detecting signals $VS_L$ and $VS_R$, determines the steering direction and obtains a predetermined turning radius $R_{ST}$ with reference to the lookup table in the memory 10 based on the graph of FIG. 6. At this time, the turning direction such as leftward turning and rightward turning, is also determined based on the difference of the steering angles $\alpha_L$ and $\alpha_R$.

The turning radius operation 63 detects the articulation angle (connection angle) $\beta$ based on the information of the angle detecting signal AS, determines the articulation angle (connection angle) $\beta$ and obtains the predetermined turning radius $R_{AR}$ with reference to the lookup table in the memory 101 based on the graph of FIG. 7.

Subsequently, the turning radius operation 63 checks whether the turning direction of the front wheels 2 and 3 and the articulation direction of the respective frames 51 and 52 are the same. When the directions are equal, the turning radius R is calculated by the following function of (1) and, when the directions are different, the turning radius R is calculated by the following function of (2).

$$R = f_1(R_{ST}, R_{AR}) \quad (1)$$

$$R = f_2(R_{ST}, R_{AR}) \quad (2)$$

Next, when the turning radius R is calculated as twenty meters by the turning radius operation 63, the steering-wheel revolution number controller 66 refers to the lookup table based on the graph of FIG. 8 to obtain a revolution number ratio $n_1$ when the turning radius R=twenty meters. According to the graph of FIG. 8, $n_1$=1.2, so that the controller 66 judges that the front-wheels 2 and 3 have to be rotated 1.2 times faster than the rear-wheels 4 and 5.

The steering-wheel revolution number controller 66 calculates a revolution number Mrpm of the rear-wheels 4 and 5. The revolution number Mrpm of the rear-wheels 4 and 5 is calculated based on the converter revolution number detecting signal QS from the converter output-side revolution sensor 67 and the speed range detecting signal TS from the speed range sensor 36. The revolution number Mrpm of the rear-wheels 4 and 5 multiplied by 1.2 (1.2 Mrpm) is the necessary revolution number required for the front-wheels 2 and 3.

Further, the steering-wheel revolution number controller 66 monitors the engine speed detecting signal ES from the engine speed sensor 65 and monitors output condition of the speed range switching signal MS to the solenoid valve 26, i.e., the speed range of the hydraulic motors 14 and 15.

In the below description, it is supposed that the engine speed of the engine 6 is judged as 1000 rpm based on the engine speed detecting signal ES and the speed range of the hydraulic motors 14 and 15 is judge as the first step.

According to the above condition, the necessary revolution number of the front-wheels 2 and 3 is 1.2 Mrpm and the engine speed of the engine 6 is 1000 rpm, so that the revolution number ratio $n_2$ is $1.2 \times 10^{-3}$ Mrpm. Accordingly, the steering-wheel revolution number controller 66 refers to the lookup table based on the graph of FIG. 9 to obtain the optimum swash plate angle $\theta_1$ when the speed range of the hydraulic motor 14 and 15 is in the first step and adjusts the swash plate angle of the hydraulic pump 13 to $\theta_1$ to obtain optimum flow rate of the hydraulic oil to rotate the front-wheels 2 and 3 driven by the hydraulic motors 14 and 15 at a speed 1.2 times faster than the rear-wheels 4 and 5.

Incidentally, when the speed range of the hydraulic motors 14 and 15 is in the second step, as shown in FIG. 9, the steering-wheel revolution number controller 66 obtains an optimum swash angle $\theta_2$. The swash plate angle $\theta_2$ is smaller than the swash plate angle $\theta_1$, so that the front wheels 2 and 3 are rotated at the same revolution number as in the swash plate angle $\theta_1$ with less discharge flow rate of hydraulic oil.

The above is the flow of rotation correction control of the front-wheels 2 and 3 while turning the motor grader 1.

Incidentally, even when the revolution number of the rear wheels 4 and 5 is the same Mrpm, the engine speed of the engine 6 may become different. In the above example, when the revolution number of the rear-wheels 4 and 5 is Mrpm, the engine speed of the engine 6 is 1000 rpm. However, when the speed range of the transmission 9 is in a higher position (small gear ratio side), the same revolution number of Mrpm of the rear wheels 4 and 5 can be obtained with low engine speed of about 800 rpm.

Because not so much of torque is required in descending a slope, even when the revolution number Mrpm of the rear-wheels 4 and 5 can be obtained with low engine speed though the transmission 9 is in the same speed range.

In this condition, since the engine speed 1000 rpm is lowered to 800 rpm in the graph of FIG. 9, the ratio of revolution number $n_2$ increases to $1.5 \times 10^{-3}$M.

However, because the $n_2$ becomes too great and, when the speed range of the hydraulic motors 14 and 15 is in the first step, the optimum swash plate angle may become $\theta_3$ to exceed the maximum swash plate angle $\theta_{MAX}$ (the revolution number of the front-wheels 2 and 3 does not catch up with the revolution number of the rear-wheels 4 and 5 even when the swash plate angle $\theta$ is maximized), the controller 100 automatically switches the speed range of the motors 14 and 15 to the second step in advance. Accordingly, the steering-wheel revolution number controller 66 obtains an optimum swash plate angle $\theta_4$, not the optimum swash plate angle $\theta_3$.

When the turning direction of the front-wheels 2 and 3 and the articulation direction of the respective frames 51 and 52 differ, the direction of the front-wheels 2 and 3 may be aligned to the direction of the rear-wheels 4 and 5 to run the motor grader 1 straight. In this case, the actual turning radius is detected as R=∞ according to the above function (2) and it is determined that the ratio of the revolution number $n_1$=1 in the graph of FIG. 8. In other words, the necessary revolution number required for the front-wheels 2 and 3 in the graph of FIG. 9 becomes equal to the revolution number of the rear-wheels 4 and 5. The optimum swash plate angle θ is calculated from the necessary revolution number in the same manner as in the turning movement.

When the vehicle is turned while the blade 50 is in contact with the ground or the ground is slippery, and when the turning radius R is twenty meters as in the above, the front-wheels 2 and 3 can be slipped when the front wheels 2 and 3 are rotated 1.2 times faster than the rear-wheels 4 and 5 as in the above. In this case, it is desired that the revolution number ratio $n_1$ (FIG. 8) is set smaller.

Accordingly, in the steering-wheel revolution number correction system 60 of the present embodiment, the operator having checked the ground condition operates the front-wheel rotation control lever 35 shown in FIG. 4 to shift the relationship curve in FIG. 8 leftward to uniformly decrease the revolution number ratio $n_1$ (FIG. 8) at the turning radius R (see single-dotted line). Accordingly, the torque in the front-wheels 2 and 3 can be restrained, thereby further preventing slippage.

According to the present embodiment, the following effects can be obtained.

(1) Because the turning radius R is determined from the steering angle $\alpha_L$ and $\alpha_R$ of the front-wheels 2 and 3 and the articulation angle β of the respective frames 51 and 52 and the front-wheels 2 and 3 are automatically rotated faster than the rear-wheels 4 and 5 based on the turning radius R, the revolution number M of the rear-wheels 4 and 5, the engine speed of the engine 6 and the speed range of the hydraulic motors 14 and 15, the conventional trouble for operating the correcting lever while turning the motor grader 1 or the skilled work for adjusting the revolution number of the front-wheels 2 and 3 to the revolution number of the rear-wheels 4 and 5 can be eliminated, so that the revolution number of the front-wheels 2 and 3 can be easily and accurately controlled to securely prevent the tight-corner braking phenomenon.

(2) Because the target revolution number of the front wheels 2 and 3 is determined based on the turning radius R, the front-wheels 2 and 3 can be rapidly rotated at a revolution number corresponding to the turning radius R where, for instance, the target revolution number of the front-wheels 2 and 3 can be set higher as turning radius R becomes smaller, so that the tight-corner braking phenomenon can be further securely prevented.

Further, in the present system 60, the revolution number of the front-wheels 2 and 3 can be sufficiently set high irrespective of slippage of the rear-wheels 4 and 5, so that the front-wheels 2 and 3 can be securely rotated at a high speed while turning the vehicle without necessarily accompanying slippage of the rear wheels 4 and 5.

(3) Because the revolution number ratio $n_1$ in increasing the speed of the front-wheels 2 and 3 can be changed by the front-wheel rotation control lever 35, the torque of the front-wheels 2 and 3 can be lowered by setting the revolution number ratio $n_1$ at a lower level when the front-wheels 2 and 3 are likely to slip, so that the front-wheels 2 and 3 can be securely in contact with the ground to prevent slippage. Accordingly, the vehicle can be turned smoothly when the blade 50 is in contact with the ground to reduce ground pressure of the front-wheels 2 and 3 or when the vehicle is on pressed snow.

(4) Because the flow rate of delivery oil from the hydraulic pump 13 can be controlled by operating the front-wheel rotation control lever 35 and the revolution number can be adjusted as desired in accordance with slippage of the front-wheels 2 and 3, when the blade 50 is used during operation, continuous slippage of the front-wheels 2 and 3 with decreased ground pressure can be avoided, thus preventing useless energy consumption.

(5) Because the rear-wheel revolution number sensor 64 is composed of the converter output rotation sensor 67 for detecting revolution number of output side of the torque converter 8 and the speed range sensor 36 for detecting the speed range of the transmission 9 connected to the output side of the torque converter 8, the revolution number Mrpm of the rear-wheels 4 and 5 can be accurately calculated by detecting the revolution number inputted into the transmission 9 and the speed range in the transmission 9 even in the present embodiment where the engine speed does not directly become the input revolution number of the transmission 9 on account of the torque converter 8.

(6) Because the steering-wheel revolution number correction system 60 rotates the hydraulic motors 14 and 15 and, as a result, the front-wheels 2 and 3 by controlling the flow rate of the delivery oil from the hydraulic pump 13, the size of the hydraulic motors 14 and 15 can be reduced by simplifying the structure thereof, where, for instance, the hydraulic motors 14 and 15 is not required to be variable capacity type. Accordingly, the hydraulic motors 14 and 15 can be suitably accommodated in a narrow space such as inside of the knuckle 70.

(7) Though the two-stage speed range is set in the hydraulic motors 14 and 15, since the steering-wheel revolution number correction system 60 deals the speed range of the hydraulic motors 14 and 15 as a parameter for controlling the flow rate of the delivery oil from the hydraulic pump 13, the speed range can be accurately detected, so that the swash plate angle θ of the hydraulic pump 13 can be accurately adjusted in any arrangement where the speed ranges are set in either the first or the second step, thereby obtaining an optimum delivery oil flow rate to smoothly turn the vehicle.

(8) In order to curb the fuel consumption of the engine 6, the rear-wheels 4 and 5 are sometimes rotated at a high speed by setting the speed range of the transmission 9 on the side of small gear ratio while maintaining the low engine speed. In this case, since the hydraulic pump 13 is also driven at a low revolution number, even when the discharge flow rate by the hydraulic pump 13 is set maximum, the rotation of the hydraulic motors 14 and 15 reaches limit thereof, so that the front-wheels 2 and 3 may not be able to rotate faster than the rear-wheels 4 and 5.

On the other hand, by using the hydraulic motors 14 and 15 of the present embodiment, when the delivery oil flow rate from the hydraulic pump 13 is maximized and the hydraulic motors 14 and 15 cannot be rotated more rapidly at the first speed range, the hydraulic motors 14 and 15 can be rotated at a higher speed by switching the speed range to the second step. Further, fuel expenses can be lowered by driving with low torque and high-speed.

[Second Embodiment]

Next, a second embodiment of the present invention will be described below.

The second embodiment includes a steering-wheel revolution number correction system 160 instead of the steering-wheel revolution number correction system 60 of the first embodiment. Accordingly, the description for common components will be omitted and the description will be concentrated on the steering-wheel revolution number correction system 160 as a different component.

Figure 10:
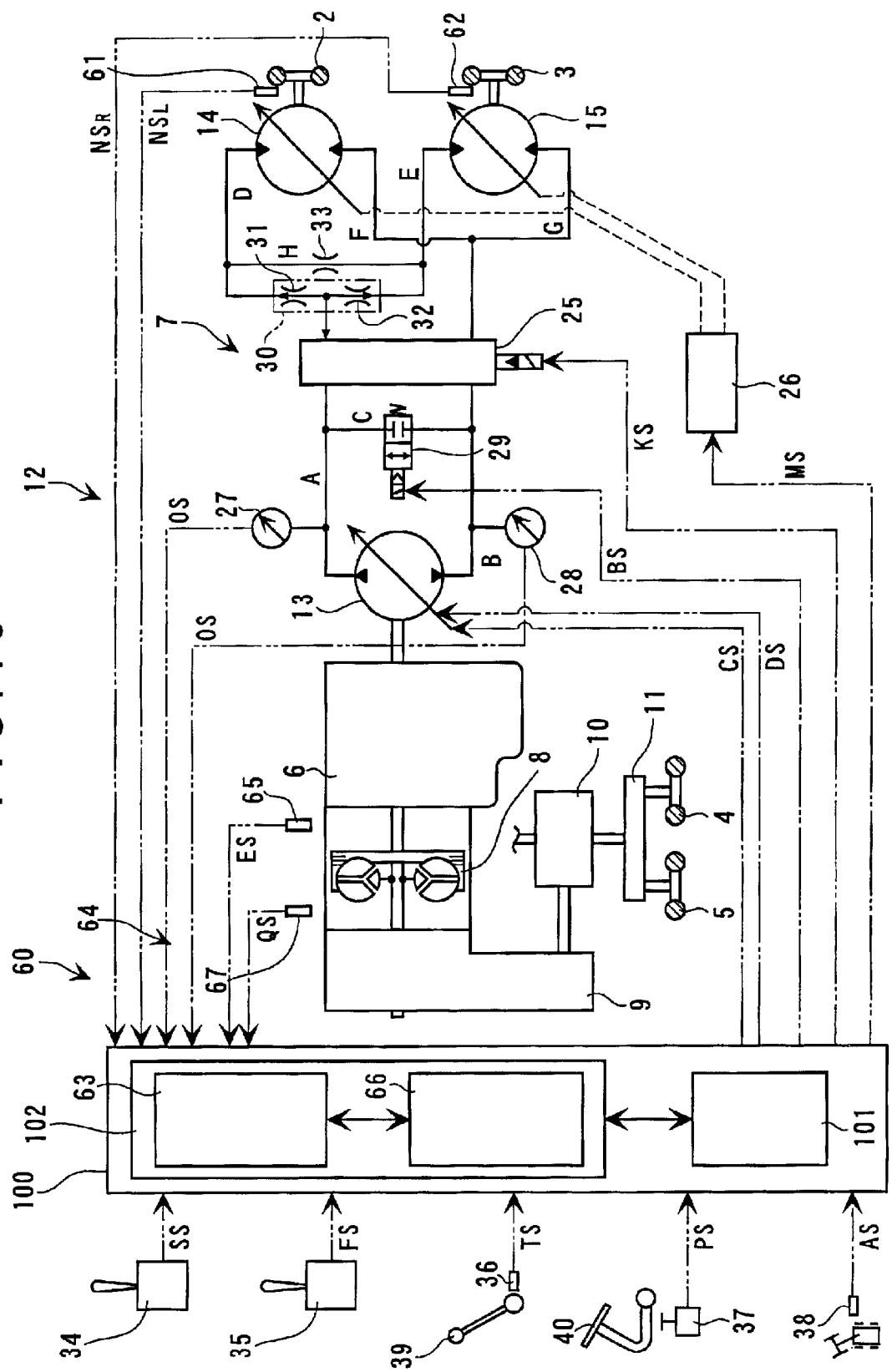
FIG. 10 is a block diagram showing an outline arrangement of a motor grader according to second embodiment of the present invention.

In FIG. 10, the steering-wheel revolution number correction system 160 includes a left pickup sensor 161 as a steering-wheel revolution number detecting means for detecting the revolution number of the left front-wheel 2, a right pickup sensor 162 as another steering-wheel revolution number detecting means for detecting the revolution number of the right front-wheel 3, a turning radius operation 163 for determining the turning radius of the front-wheels 2 and 3 based on the revolution number of the front wheels 2 and 3, a rear-wheel revolution number sensor 164 for detecting revolution number of the rear-wheels 4 and 5, an engine speed sensor 165 as an engine speed detecting means for detecting the engine speed, and a steering-wheel revolution number controller 166 for controlling the revolution number of the front-wheels 2 and 3 based on the turning radius, the revolution number of the rear-wheels 4 and 5 and the engine speed of the engine 6.

The pickup sensors 161 and 162 output a steering-wheel revolution number detecting signals $NS_L$ and $NS_R$ corresponding to the revolution number of the front-wheels 2 and 3 to the controller 100.

The rear-wheel revolution number sensor 164 is composed of a converter output-side revolution sensor 167 as a converter output revolution number detecting means for detecting the revolution number of the output side of the torque converter 8 and the speed range sensor 36 for detecting the speed range of the transmission shift lever 39.

The converter output-side revolution sensor 167 output a converter revolution number detecting signal QS to the controller 100.

The engine speed sensor 165 outputs an engine revolution number detecting signal ES to the controller 100.

The turning radius operation 163 and the steering-wheel revolution number controller 166 are software, which is stored in the memory 101 constituting the controller 100 such as ROM and RAM and is called from the memory 101 when the system 60 is actuated and is implemented by the CPU 102 as shown in FIG. 10.

Figure 11:
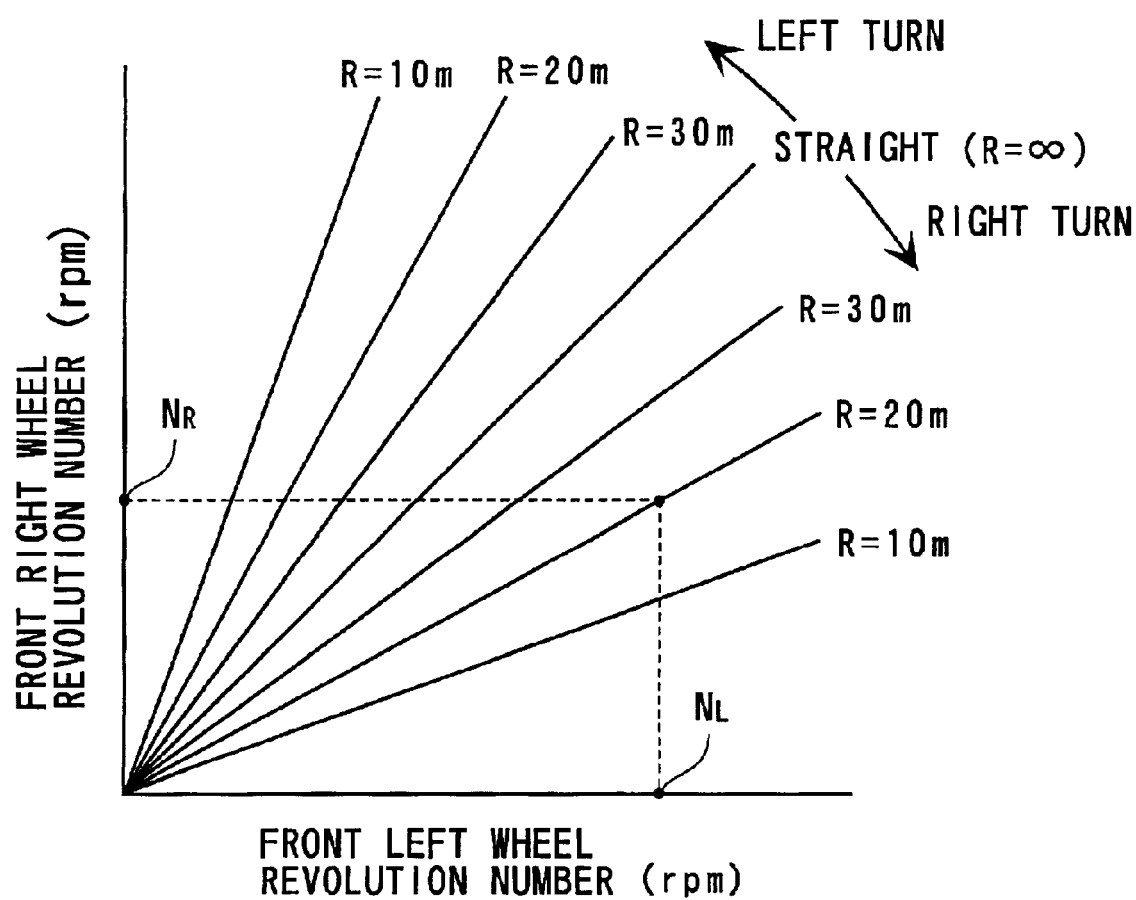
FIG. 11 is a graph showing contents of a lookup table used in the second embodiment.

The memory 101 of the controller 100 stores a lookup table (not shown) tabling the graph shown in FIGS. 8, 9 and 11 as well as the above software.

FIG. 11 is a graph showing turning radius R and turning direction of the front-wheels 2 and 3 corresponding to respective revolution number $N_L$ and $N_R$ of the left front-wheel 2 and the right front wheel 3.

FIGS. 8 and 9 are the same as described in the first embodiment.

Next, revolution number control of the front-wheels 2 and 3 by the steering-wheel revolution number correction system 160 will be described below in detail.

Initially, when the motor grader 1 is running, the turning radius operation 163 monitors the steering-wheel revolution number detecting signal $NS_L$ and $NS_R$ outputted from the respective pickup sensors 161 and 162. When the motor grader 1 starts turning, for instance, rightward, because the left front-wheel 2 is located outside and the right-front-wheel 3 is located inside, the left front-wheel 2 rotates faster than the right front-wheel 3 while being slightly braked.

The turning radius operation 163 judges that the revolution number $N_L$ of the left front-wheel 2 is greater than the revolution number $N_R$ of the right front-wheel 3 and the vehicle is turning rightward based on the information of the steering-wheel revolution number detecting signal $NS_L$ and $NS_R$, and obtain the turning radius, for instance, twenty meters, with reference to the lookup table in the memory 101 based on the graph of FIG. 11.

The steering-wheel revolution number controller 166 calculates a revolution number ratio $n_1$ when the turning radius R=twenty meters with reference to the lookup table based on the graph of FIG. 8. According to the graph of FIG. 8, $n_1=1.2$, so that the steering-wheel revolution number controller 166 determines that the front-wheels 2 and 3 has to be rotated 1.2 times faster than the rear-wheels 4 and 5.

The steering-wheel revolution number controller 166 calculates a revolution number Mrpm of the rear-wheels 4 and 5. The revolution number Mrpm of the rear-wheels 4 and 5 is calculated based on the converter revolution number detecting signal QS from the converter output-side revolution sensor 167 and the speed range detecting signal TS from the speed range sensor 36. The revolution number Mrpm of the rear-wheels 4 and 5 multiplied by 1.2 (1.2 Mrpm) is the necessary revolution number required for the front-wheels 2 and 3.

Further, the steering-wheel revolution number controller 166 monitors the engine speed detecting signal ES from the engine speed sensor 165 and monitors output condition of the speed range switching signal MS to the solenoid valve 26, i.e., the speed range of the hydraulic motors 14 and 15.

In the below description, it is supposed that the engine speed of the engine 6 is judged as 1000 rpm from the engine speed detecting signal ES and the speed range of the hydraulic motors 14 and 15 is in the first step.

According to the above condition, the necessary revolution number of the front-wheels 2 and 3 is 1.2 Mrpm and the engine speed of the engine 6 is 1000 rpm, so that the revolution number ratio $n_2$ is $1.2 \times 10^{-3}$ Mrpm. Accordingly, the steering-wheel revolution number controller 166 refers to the lookup table based on the graph of FIG. 9 to obtain the optimum swash plate angle $\theta_1$ when the speed range of the hydraulic motor 14 and 15 is in the first step and adjusts the swash plate angle of the hydraulic pump 13 to $\theta_1$ to obtain optimum flow rate of the hydraulic oil to rotate the front-wheels 2 and 3 driven by the hydraulic motors 14 and 15 at a speed 1.2 times faster than the rear-wheels 4 and 5.

Incidentally, when the speed range of the hydraulic motors 14 and 15 is in the second step, as shown in FIG. 9, the steering-wheel revolution number controller 166 obtains an optimum swash angle $\theta_2$. The swash plate angle $\theta_2$ is smaller than the swash plate angle $\theta_1$, so that the front wheels 2 and 3 are rotated at the same revolution number as in the swash plate angle $\theta_1$ with less discharge flow rate of hydraulic oil.

The above is the flow of rotation correction control of the front-wheels 2 and 3 while turning the motor grader 1.

Incidentally, even when the revolution number of the rear wheels 4 and 5 is the same Mrpm, the engine speed of the engine 6 may become different. In the above example, when the revolution number of the rear-wheels 4 and 5 is Mrpm, the engine speed of the engine 6 is 1000 rpm. However, when the speed range of the transmission 9 is in a higher position (small gear ratio side), the same revolution number of Mrpm of the rear wheels 4 and 5 can be obtained with low engine speed of about 800 rpm.

Because not so much of torque is required in descending a slope, even when the revolution number Mrpm of the rear-wheels 4 and 5 can be obtained with low engine speed though the transmission 9 is in the same speed range.

In this condition, because the engine speed 1000 rpm is lowered to 800 rpm in the graph of FIG. 9, the ratio of revolution number $n_2$ increases to $1.5 \times 10^{-3}$M.

However, because the $n_2$ becomes too great and, when the speed range of the hydraulic motors 14 and 15 are in the first step, the optimum swash plate angle may become $\theta_3$ to exceed the maximum swash plate angle $\theta_{MAX}$ (the revolution number of the front-wheels 2 and 3 does not catch up with the revolution number of the rear-wheels 4 and 5 even when the swash plate angle θ is maximized), the controller 100 automatically switches the speed range of the motors 14 and 15 to the second step in advance. Accordingly, the steering-wheel revolution number controller 166 obtains an optimum swash plate angle $θ_4$, not the optimum swash plate angle $θ_3$.

When the motor grader 1 moves straight, the turning radius is detected as R=∞ since there is no difference between the revolution number $N_L$ and $N_R$ of the front-wheels 2 and 3 and it is determined that the ratio of the revolution number $n_1$=1 in the graph of FIG. 8. In other words, the necessary revolution number required for the front-wheels 2 and 3 in the graph of FIG. 9 becomes equal to the revolution number of the rear-wheels 4 and 5. The optimum swash plate angle θ is calculated from the necessary revolution number in the same manner as in the turning movement.

When the vehicle is turned while the blade 50 is in contact with the ground or the ground is slippery, and when the turning radius R is twenty meters as in the above, the front-wheels 2 and 3 can be slipped when the front wheels 2 and 3 are rotated 1.2 times faster than the rear-wheels 4 and 5 as in the above. In this case, it is desired that the revolution number ratio $n_1$ (FIG. 8) is set smaller.

Accordingly, in the steering-wheel revolution number correction system 160 of the present embodiment, the operator having checked the ground condition operates the front-wheel rotation control lever 35 shown in FIG. 10 to shift the relationship curve in FIG. 8 leftward to uniformly decrease the revolution number ratio $n_1$ (FIG. 8) at the turning radius R (see single-dotted line). Accordingly, the torque in the front-wheels 2 and 3 can be restrained to prevent slippage.

According to the present embodiment, the following effect can be obtained.

(1') Because the turning radius R is determined from the revolution number $N_L$ and $N_R$ of the front-wheels 2 and 3, and the front-wheels 2 and 3 are automatically rotated faster than the rear-wheels 4 and 5 based on the turning radius R, the revolution number M of the rear-wheels 4 and 5, the engine speed of the engine 6 and the speed range of the hydraulic motors 14 and 15, the conventional trouble for operating the correcting lever while turning the motor grader 1 or the skilled work for adjusting the revolution number of the front-wheels 2 and 3 to the revolution number of the rear-wheels 4 and 5 can be eliminated, so that the revolution number of the front-wheels 2 and 3 can be easily and accurately controlled to securely prevent the tight-corner braking phenomenon.

Further, the effects (2) to (8) of the above-described first embodiment can be obtained in the second embodiment.

[Modifications]

Incidentally, the scope of the present invention is not restricted to the above embodiment but includes other arrangement as long as an object of the present invention can be achieved, which includes following modifications.

Figure 12:
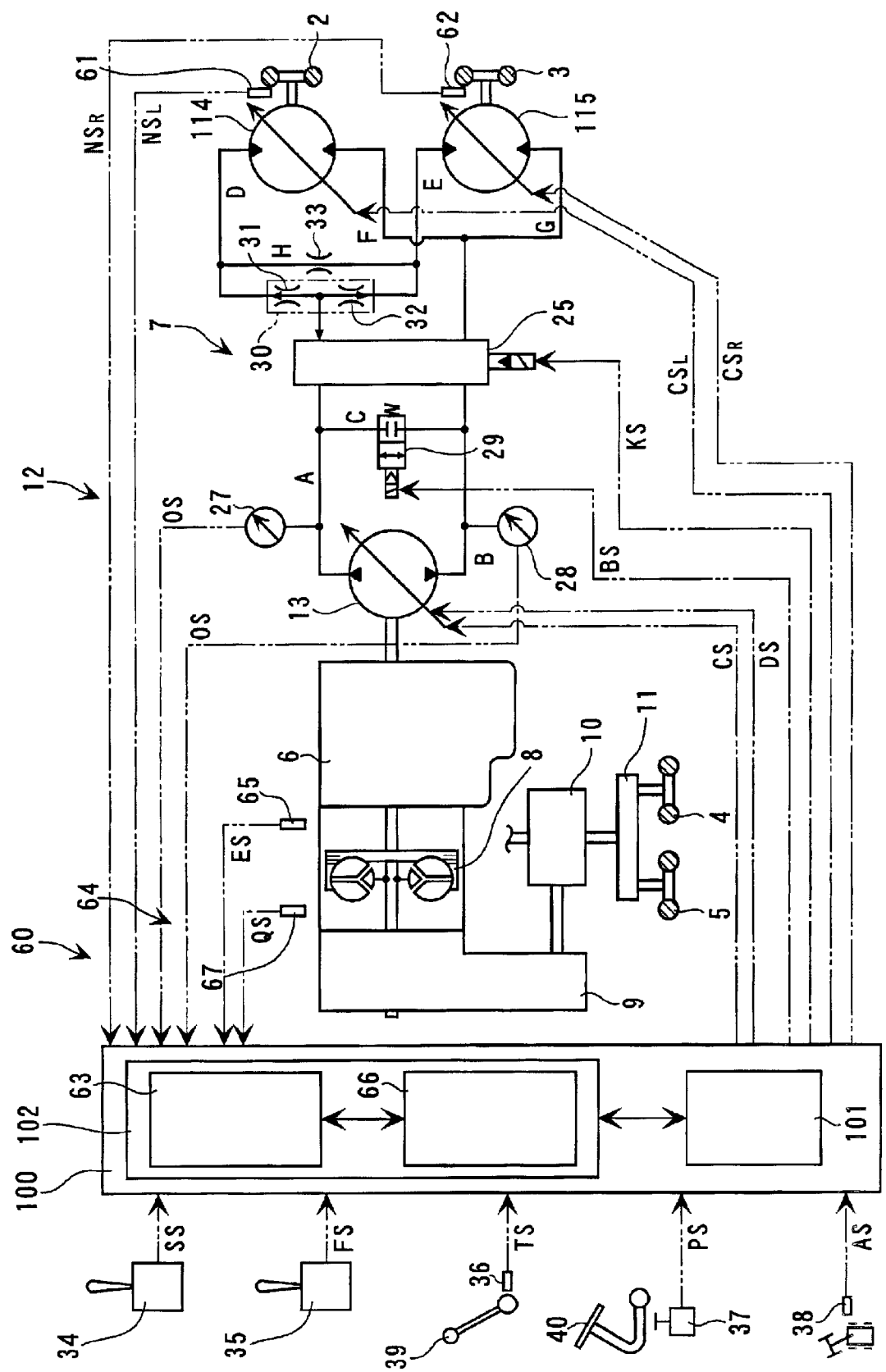
FIG. 12 is a block diagram showing a modification of the first embodiment.
Figure 13:
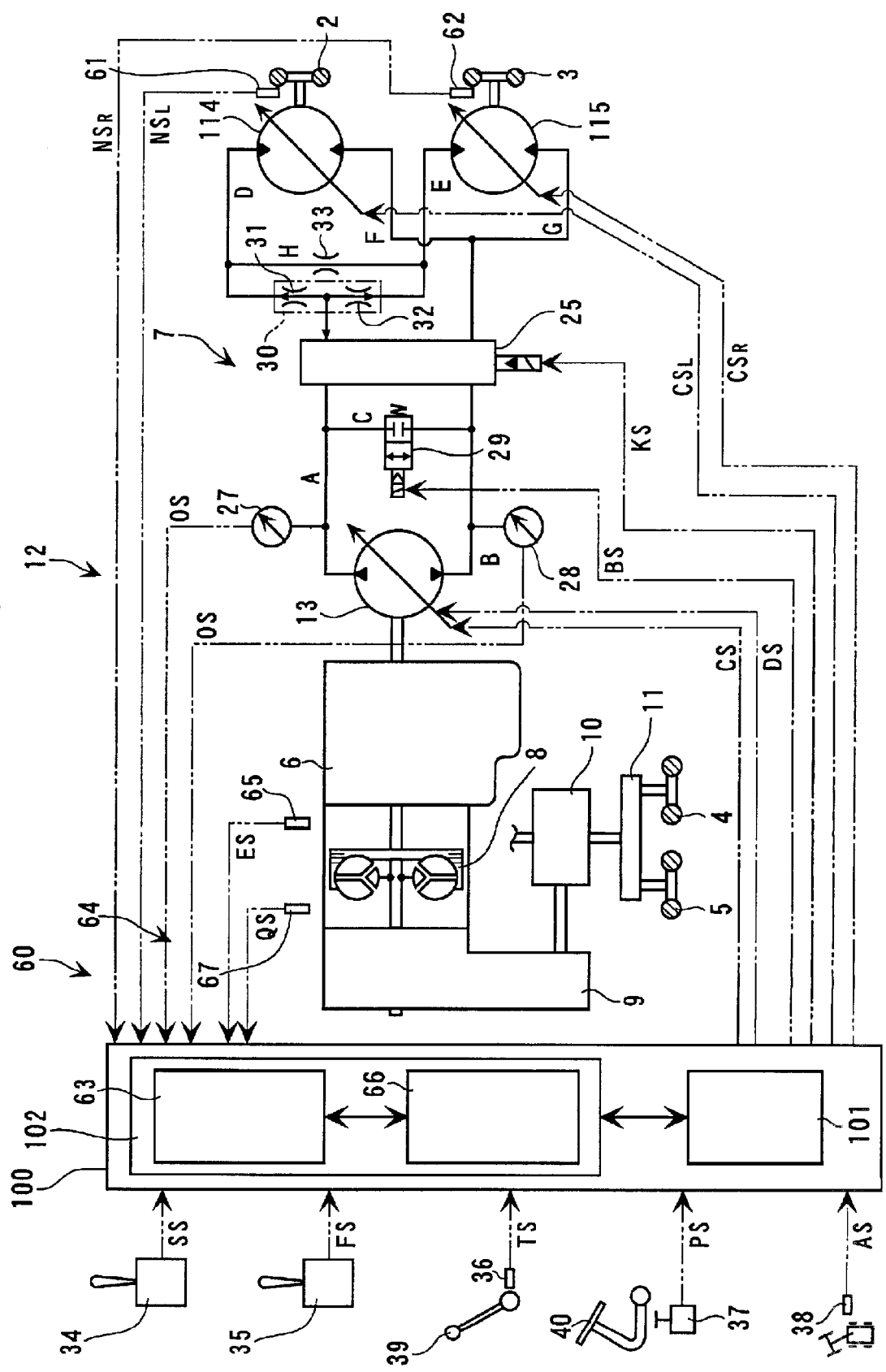
FIG. 13 is a block diagram showing a modification of the second embodiment.

For instance, the arrangement shown in FIG. 12 may be applied to the first embodiment (FIG. 4) and the arrangement shown in FIG. 13 may be applied to the second embodiment (FIG. 10). In the arrangement of the FIGS. 12 and 13, in addition to controlling the delivery oil flow rate by setting the hydraulic pump as variable capacity type, hydraulic motors 114 and 115 are made variable capacity type such as swash plate type and angled axis type to vary the revolution number at a predetermined supply oil flow rate, where the swash plate angle and angle of the angled axis of the hydraulic motors 114 and 115 are independently controlled by control signals $CS_L$ and $CS_R$ from the controller 100 to rotate the front-wheels at a speed higher than the rear-wheels 4 and 5 without employing the solenoid valve 26 shown in FIG. 4 or 10.

According to the arrangement using the variable capacity hydraulic motors 114 and 115, the outer wheel of the left and right wheels 2 and 3 can be positively moved faster and the inner wheel can be positively moved slower in turning the motor grader 1, so that the turning movement can be conducted more smoothly.

Because the hydraulic motors and 115 can be directly controlled by the control signals $CS_L$ and $CS_R$ from the controller 100 to change the revolution number, the low-torque high-speed drive can be securely achieved when the delivery oil flow rate from the hydraulic pump 13 is small. Accordingly, when the engine speed of the engine 6 is rapidly decreased from the high-speed side on account of the characteristics of the torque converter 8, the rotation of output side of the torque converter 8 can be maintained at a high speed, so that the front-wheels can be continuously rotated at a high speed even when the rear-wheels 4 and 5 still are rotated at a high-speed, thereby restraining tight-corner braking phenomenon during the condition.

Incidentally, the hydraulic pump 13 may be stationary type and the front-wheels 2 and 3 may be rotated faster than the rear-wheels 4 and 5 only by controlling the hydraulic motors 114 and 115, which is included in the scope of the present invention.

The swash plate angle and angle of the angled axis of the hydraulic motors 114 and 115 may not be controlled by independent control signals $CS_L$ and $CS_R$ but may be controlled by a single control signal.

Though each of the right and left front wheels 2 and 3 are driven by independent hydraulic motors 14, 15, 114 and 115 in the above-described embodiments and modifications shown in FIGS. 12 and 13, both of the front-wheels 2 and 3 may be driven by a single hydraulic motor.

Both of the steering angle $α_L$ and $α_R$ of the front-wheels 2 and 3 are detected in the first embodiment because the steering angle $α_L$ and $α_R$ caused by steering operation differ in the left front-wheel 2 and the right front-wheel 3 on account of link mechanism, and also because the turning direction can be easily identified by the difference between the steering angle $α_L$ and $α_R$. In other words, since the above embodiment uses a link mechanism where the inner wheel steering angle is always greater than the steering angle on the outer wheel side during turning movement, when, for instance, the steering angle $α_L$ is detected greater than the steering angle $α_R$, it is easily recognized that the vehicle is in leftward turning where the left wheel 2 is located inner side and the right wheel 3 is located outside.

The above explanation suggests that the turning radius $R_{ST}$ is not necessarily obtained from both of the steering angles $α_L$ and $α_R$ if the turning direction of the front-wheels 2 and 3 can be identified by the other means such as a sensor. Specifically, if the turning direction of the front-wheels 2 and 3 can be identified, one of the front-wheel steering angles relative to the other front-wheel steering angle can be calculated in view of the structure of the link mechanism, and the rotating radius $R_{ST}$ can also be calculated from the actually detected steering angle and the calculated steering angle.

However, because it is costly to provide other means for identifying the turning radius of vehicle and the calculation of the turning radius can be complicated, it is preferable that both of the steering angle and the turning angle can be detected using the same two steering angle sensors 61 and 62 as in the above embodiment.

Though the steering angle sensors 61 and 62 for detecting the steering angles $α_L$ and $α_R$ around the king pin 73 are used as the front-wheel steering angle detecting means in the first embodiment, the front-wheel steering angle detecting means according to the present invention is not restricted to such arrangement, but a sensor for detecting advancement and retraction of the right and left steering cylinders 74 may be used.

Though the angle detection signal AS from the angle sensor 38 for detecting the articulation angle is used only for displaying rotation of the front frame 51 on the indicator in the cockpit in the second embodiment, the angle detecting signal AS may be used as a parameter for controlling the delivery oil flow rate from the hydraulic pump 13.

When the front frame 51 is turned relative to the rear frame 52, because the difference between the turning radius of the front-wheels 2 and 3 and the turning radius of the rear-wheels 4 and 5 becomes greater, though the front-wheels 2 and 3 are of the same turning radius, there may be difference in easiness for turning the vehicle. Accordingly, when the front frame 51 is turned, the revolution number ratio $n_1$ of FIG. 8 determined when the front frame 51 is not turned may be properly corrected in accordance with the articulation angle. Accordingly, the revolution number of the front-wheels 2 and 3 can be adjusted properly in accordance with the articulation angle, thereby achieving the steering-wheel revolution number correction system more suitable for the motor grader 1.

The steering-wheel revolution number correction system according to the present invention is not restricted to be applied to the motor grader 1 as in the respective embodiments, but may be applied to the other all-wheel-drive vehicle having an all-wheel drive having a rear-wheel driven by an output of the engine transmitted through a transmission, a hydraulic pump receiving the output of the engine and a hydraulic motor rotated by the delivery oil from the hydraulic pump to drive the front-wheel.

For instance, the steering-wheel revolution number correction system 60 of the first embodiment is not limited to be applied to the motor grader 1, but may be used for an articulating type all-wheel-drive vehicle having a front frame provided with a front-wheel and a rear frame provided with the rear-wheel which are angle-adjustably connected such as a construction equipment of a large-size wheel loader having an articulating frame etc.

The steering-wheel revolution number correction system 160 of the second embodiment is not restricted to be applied to the motor grader 1 but may be used for the other construction equipment such as a wheel loader and a work vehicle such as non-articulating dump truck.

What is claimed is:

1. A steering-wheel revolution number correction system used for an all-wheel-drive vehicle having an articulated frame in which a steering-wheel is driven by a hydraulic motor rotated by delivery oil from a hydraulic pump, the system comprising:

a steering-wheel steering angle sensor for detecting a steering angle of a steering-wheel;

an articulation angle sensor for detecting a connection angle of a front frame provided with the steering-wheel and a rear frame provided with the rear-wheel;

a turning radius operation means for calculating a turning radius of the vehicle based on the steering direction and the steering angle of the steering-wheel, and the connection angle of the frames;

a rear-wheel revolution number sensor for detecting a revolution number of the rear-wheel; and a steering-wheel revolution number controller for rotating the steering-wheel faster than the rear-wheel based on the turning radius and the revolution number of the rear-wheel, wherein the turning radius operation means utilizes a first function for computing turning radius when the steering angle of the steering wheel and the frame articulation direction are the same and a second function different from the first function when the turning direction of the steering wheel and the frame articulation direction are not the same.

2. The steering-wheel revolution number correction system of all-wheel-drive vehicle according to claim 1, further comprising a torque converter provided between an engine and a transmission, wherein the rear-wheel revolution number sensor includes a torque converter output side revolution number sensor for detecting a revolution number on an output side of the torque converter and a speed range sensor for detecting a speed range of the transmission connected to the output side of the torque converter.

3. The steering-wheel revolution number correction system of all-wheel-drive vehicle according to claim 1, wherein the steering-wheel revolution number controller controls a flow rate of the delivery oil from the hydraulic pump to be supplied to the hydraulic motor based on the turning radius and the revolution number of the rear-wheel.

4. The steering-wheel revolution number correction system of all-wheel-drive vehicle according to claim 1, wherein a plurality of speed ranges are set in the hydraulic motor, and wherein the steering-wheel revolution number controller controls a flow rate of the delivery oil from the hydraulic pump based on the speed range of the hydraulic motor as well as the turning radius and the revolution number of the rear-wheel.

5. The steering-wheel revolution number correction system of all-wheel-drive vehicle according to claim 1, wherein the revolution number of the hydraulic motor is variable-capacity type at a predetermined oil supply, and wherein the steering-wheel revolution number controller controls the revolution number of the hydraulic motor in accordance with the turning radius and the revolution number of the rear-wheel.

* * * * *